(12) United States Patent
Kim et al.

(10) Patent No.: US 10,061,559 B2
(45) Date of Patent: Aug. 28, 2018

(54) APPARATUS AND METHOD FOR CONTROLLING OPERATION

(71) Applicant: Samsung Electronics Co., Ltd., Gyeonggi-do (KR)

(72) Inventors: Hyunpil Kim, Seoul (KR); Seongwoo Ahn, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 83 days.

(21) Appl. No.: 15/134,842

(22) Filed: Apr. 21, 2016

(65) Prior Publication Data

US 2017/0068518 A1  Mar. 9, 2017

(30) Foreign Application Priority Data

Sep. 9, 2015 (KR) .................. 10-2015-0127778

(51) Int. Cl.
| | | |
|---|---|---|
| G06F 7/48 | (2006.01) | |
| G06F 7/53 | (2006.01) | |
| G06F 7/523 | (2006.01) | |
| G06F 7/57 | (2006.01) | |

(52) U.S. Cl.
CPC ............ *G06F 7/4812* (2013.01); *G06F 7/523* (2013.01); *G06F 7/5324* (2013.01); *G06F 7/57* (2013.01)

(58) Field of Classification Search
CPC .......................... G06F 7/4812; G06F 7/5324
See application file for complete search history.

(56) References Cited

U.S. PATENT DOCUMENTS

| | | | | |
|---|---|---|---|---|
| 5,442,799 A * | 8/1995 | Murakami | ............. | H04N 5/145 348/E5.066 |
| 5,777,915 A * | 7/1998 | Witte | .................... | G06F 7/4812 708/620 |
| 6,286,024 B1 * | 9/2001 | Yano | .................... | G06F 7/5324 708/625 |
| 6,460,064 B1 * | 10/2002 | Lee | ........................ | G06F 7/5338 708/518 |
| 6,704,762 B1 | 3/2004 | Inoue | | |
| 7,428,566 B2 | 9/2008 | Siu et al. | | |
| 7,433,912 B1 | 10/2008 | Jagodik et al. | | |
| 7,805,478 B2 | 9/2010 | Son | | |
| 8,843,540 B2 | 9/2014 | Wen | | |
| 2009/0172053 A1 | 7/2009 | Nam et al. | | |
| 2009/0228686 A1 | 9/2009 | Koenck et al. | | |
| 2011/0010523 A1 | 1/2011 | Vorbach et al. | | |
| 2013/0138711 A1 * | 5/2013 | Sugisawa | ............. | G06F 7/5338 708/503 |
| 2013/0282778 A1 | 10/2013 | Sun et al. | | |
| 2014/0192977 A1 | 7/2014 | Lee et al. | | |
| 2015/0121037 A1 | 4/2015 | Van Lunteren | | |
| 2015/0154024 A1 | 6/2015 | Anderson et al. | | |

FOREIGN PATENT DOCUMENTS

| | | |
|---|---|---|
| JP | 2001134556 | 5/2001 |
| KR | 1020060011387 | 2/2006 |
| KR | 100649111 | 11/2006 |

\* cited by examiner

*Primary Examiner* — Chuong D Ngo
(74) *Attorney, Agent, or Firm* — The Farrell Law Firm, P.C.

(57) ABSTRACT

Methods and apparatuses for performing arithmetic operations efficiently and quickly are described. Such arithmetic operations include, but are not limited to, multiplying 2N bit integers, multiplying multiple N-bit integers simultaneously, multiplying 2N bit complex numbers, and other multiplication operations involving coefficients, complex numbers, and complex conjugate numbers.

20 Claims, 14 Drawing Sheets

APPARATUS AND METHOD FOR CONTROLLING OPERATION

PRIORITY

The present application claims priority under 35 U.S.C. § 119(a) to a Korean Patent Application filed in the Korean Intellectual Property Office on Sep. 9, 2015 and assigned Serial No. 10-2015-0127778, the contents of which are incorporated herein by reference.

BACKGROUND

1. Field of the Disclosure

The present disclosure relates generally to an apparatus and method for controlling an arithmetic operation and, more particularly, to providing an apparatus capable of performing a multitude of arithmetic operations without increasing its complexity.

2. Description of the Related Art

There is a demand for various services as technology is developing. Electronic devices may be required to perform various arithmetic operations to meet the demand for various services. Furthermore, a calculator may be required in the electronic device to reduce complexity of hardware, while performing various arithmetic operations.

SUMMARY

The present disclosure has been made to address at least the above-described problems and disadvantages, and to provide at least the advantages described below.

Accordingly, one aspect of the disclosure provides an apparatus and method for performing various arithmetic operations while reducing complexity of hardware.

According to an aspect of the present disclosure, a method for operating an arithmetic apparatus includes receiving first multiplication data, second multiplication data, third multiplication data, and fourth multiplication data, each having 2N bits; dividing the second multiplication data into first partition data and second partition data, each having N bits; dividing the third multiplication data into third partition data and fourth partition data, each having N bits; generating first carry data and first addition data by performing an arithmetic operation with respect to the first multiplication data, the first partition data, and the third partition data; generating first operation data based on the fourth multiplication data according to an arithmetic operation command; generating second carry data and second addition data by performing the arithmetic operation with respect to the fourth multiplication data, the second partition data, and the fourth partition data; generating second operation data based on the third multiplication data according to the arithmetic operation command; generating a first output based on at least one input of the first multiplication data, the first carry data, the first addition data, and the first operation data according to the arithmetic operation command; and generating a second output based on at least one input of the second multiplication data, the second carry data, the second addition data, and the second operation data according to the arithmetic operation command, wherein dividing the second multiplication data into the first partition data and the second partition data and dividing the third multiplication data into the third partition data and the fourth partition data are performed simultaneously or in a random order, wherein generating the first carry data and the first addition data, generating the first operation data, generating the second carry data and the second addition data, and generating the second operation data are performed simultaneously or in a random order, and wherein generating the first output and generating the second output are performed simultaneously or in a random order.

According to another aspect of the present disclosure, an arithmetic apparatus includes an arithmetic operation controller; an input unit configured to receive first multiplication data, second multiplication data, third multiplication data, and fourth multiplication data, each having 2N bits; a partition unit configured to divide the second multiplication data into first partition data and second partition data, each having N bits, and partition the third multiplication data into third partition data and fourth partition data of N bit; and a carry save adder (CSA) operatively coupled with the arithmetic operation controller and configured to generate first carry data and first addition data by performing an arithmetic operation with respect to the first multiplication data, the first partition data, and the third partition data, and generate second carry data and second addition data by performing the arithmetic operation with respect to the fourth multiplication data, the second partition data, and the fourth partition data, wherein the arithmetic operation controller is configured to generate first operation data based on the fourth multiplication data according to an arithmetic operation command, and generate second operation data based on the third multiplication data according to the arithmetic operation command, wherein the arithmetic operation controller is further configured to generate a first output based on at least one input of the first multiplication data, the first carry data, the first addition data, and the first operation data according to the arithmetic operation command, and generate a second output based on at least one input of the second multiplication data, the second carry data, the second addition data, and the second operation data according to the arithmetic operation command, wherein the partition unit is further configured to divide the second multiplication data into the first partition data and the second partition data and divide the third multiplication data into the third partition data and the fourth partition data simultaneously or in a random order, wherein the CSA is configured to generate the first carry data and the first addition data, generate the first operation data, generate the second carry data and the second addition data, and generate the second operation data simultaneously or in a random order, and wherein the arithmetic operation controller is further configured to generate the first output and to generate the second output simultaneously or in a random order.

According to an aspect of the present disclosure, a method for arithmetic operations includes receiving first data A and second data B, each comprising 2N bits, wherein A comprises N bit $A_i$ and N bit $A_q$ and B comprises N bit $B_i$ and N bit $B_q$; generating first multiplication data M1 comprising $A_iB_i$; generating second multiplication data M2 comprising $A_qB_i$; generating third multiplication data M3 comprising $A_iB_q$; generating fourth multiplication data M4 comprising $A_qB_q$; and, when multiplying A and B as integers: dividing M2 into M2[2N−1:N] and M2[N−1:0]; dividing M3 into M3[2N−1:N] and M3[N−1:0]; generating first carry data and first addition data by adding M1, M2[2N−1:N], and M3[2N−1:N]; generating second carry data and second addition data by adding M4, M2[N−1:0], and M3[N−1:0]; generating first output by adding the first carry and addition data, wherein the first output comprises the upper bits [2N−1:N] of the multiplication result; generating second output by adding the second carry and addition data, wherein the second output comprises the lower bits [N−1:0] of the multiplication result; and combining the first and second output to generate the multiplication result.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
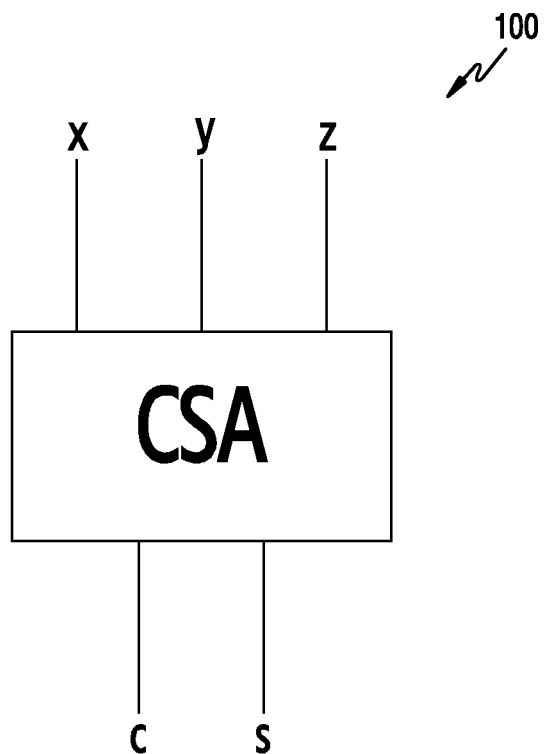
FIG. 1 illustrates a carry save adder (CSA)

Hereinafter, various embodiments of the present disclosure will be described more fully in conjunction with the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit the present disclosure to the particular embodiments disclosed herein, but the present disclosure should be construed to cover all modifications, equivalents, and/or alternatives falling within the spirit and scope of the various embodiments of the present disclosure. In the description of the drawings, identical or similar reference numerals are used to designate identical or similar elements.

Methods stated in claims and/or specifications according to various embodiments may be implemented by hardware, software, or a combination of hardware and software. In the implementation of software, a non-transitory computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein. The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the above may form a memory in which the program is stored. Further, a plurality of such memories may be included in the electronic device.

In the embodiments of the present disclosure, a component may be expressed in the singular or the plural according to the context. As such, the singular or plural expressions are selected to be suitable for certain situations for convenience of description, and the present disclosure is not limited to elements as presented in their singular or plural form. An element expressed in a plural form may be configured in singular, or an element expressed in a singular form may be configured in plural.

A processor, a modulator, a demodulator, etc. may include a calculator which can perform various arithmetic operations such as an integer multiplying operation, an adding operation, a complex number multiplying operation, etc. It is common that the calculator may be functionally divided into a multiplier, an adder, a dedicated complex number multiplier, etc., and may be included in an electronic device, etc. The various functionally divided calculators may cause additional cycle consumption and may waste surplus resources accompanied with a difference in bit number. In addition, the various functionally divided calculators may have a duty cycle reduced due to parallel arrangements thereof, and may occupy large areas and consume much power.

An arithmetic apparatus according to various embodiments herein may process an integer multiplying operation, an adding operation, a complex number multiplying operation, and a multiplying operation between a complex number and a coefficient in a single cycle. The arithmetic apparatus for processing such various arithmetic operations may include a carry save adder (hereinafter, a CSA) to perform a rapid adding operation or various arithmetic operations. The arithmetic apparatus according to various embodiments can reduce hardware complexity and improve a duty cycle and an execution speed.

The arithmetic apparatus according to various embodiments may include an N-bit multiplier, a CSA, an adder, a MUX circuit for quintuplet multiplication, and a circuit for transmitting a carry. The N-bit multiplier may multiply selected N-bit data and transmit the result of the multiplication. The CSA may add three input data and output a carry bit array (or carry data) and a sum bit array (or sum data). The adder may calculate a final resulting value by adding the carry bit array and the sum bit array.

FIG. 1 illustrates a carry save adder (CSA).

Referring to FIG. 1, the CSA 100 receives a first input x, a second input y, a third input z, and outputs a carry data output c and a sum data output s.

The first input x, the second input y, and the third input z may be formed of bit arrays. For example, the first input x may be 10011, the second input y may be 11001, and the third input z may be 01011. The carry data output c is a carry bit array which is generated by adding the first input x, the second input y, and the third input z. The sum data output s is a sum bit array which is generated by adding the first input x, the second input y, and the third input z.

For example, the CSA 100 may output the sum data output s (sum) and the carry data output c (carry) by adding the first input x, the second input y, and the third input z as shown in Equation (1) presented below:

$$
\begin{array}{rrrrrrr}
x: & & 1 & 0 & 0 & 1 & 1 \\
y: & & 1 & 1 & 0 & 0 & 1 \\
z: + & & 0 & 1 & 0 & 1 & 1 \\
\hline
s: & & 0 & 0 & 0 & 0 & 1 \\
c: + & 1 & 1 & 0 & 1 & 1 & \\
\hline
\text{sum:} & 1 & 1 & 0 & 1 & 1 & 1
\end{array}
\quad (1)
$$

The sum data output s is the sum of the first input x, the second input y, and the third input z without the carry. The carry data output c is the carry which is generated during the adding process of the first input x, the second input y, and the third input z. The carry data output c is shifted by 1 bit to reflect the carry. By these means, the CSA 100 calculates the sum of the first input x, the second input y, and the third input z by adding the carry data output c and the sum data output s.

Figure 2:
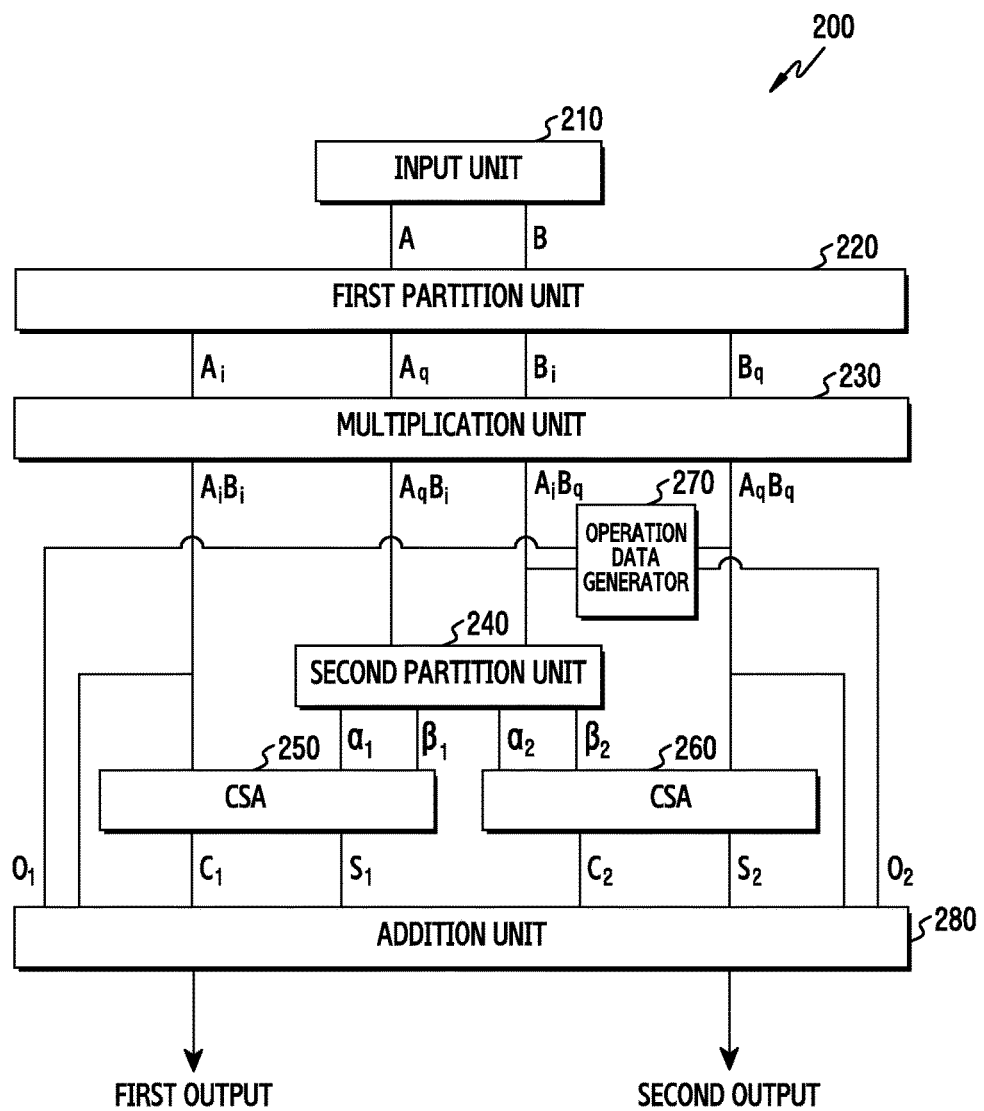
FIG. 2 is a block diagram of an arithmetic apparatus according to various embodiments.

FIG. 2 is a block diagram of an arithmetic apparatus according to various embodiments.

Referring to FIG. 2, the arithmetic apparatus 200 includes an input unit 210, a first partition unit 220, a multiplication unit 230, a second partition unit 240, a CSA 250, a CSA 260, an operation data generator 270, and an addition unit 280.

The input unit 210 receives bit data, which may be an integer, a complex number, or a coefficient. For example, the bit data may be a 2N-bit integer, a complex number including an N-bit real part and an N-bit imaginary part, an N-bit coefficient, etc. The input unit 210 may receive two or more bit data. The input unit 210 may receive two bit data in order to multiply two numbers (for example, integers or complex numbers). In addition, the input unit 210 may receive four bit data including two coefficients to in order to multiply a combination of two numbers (for example, integers or complex numbers) and a combination of two coefficients.

The input unit 210 provides the inputted bit data to the first partition unit 220. For example, the input unit 210 may receive 2N-bit data A and 2N-bit data B, and provide the received data to the first partition unit 220.

The first partition unit 220 partitions the bit data according to an arithmetic operation command. The first partition unit 220 may partition the bit data with reference to a bit-digit number. For example, the first partition unit 220 may partition the 2N-bit data A into N-bit first partial data $A_i$ and N-bit second partial data $A_q$. The first partition unit 220 may divide the 2N-bit data B into N-bit third partial data $B_i$ and N-bit fourth partial data $B_q$.

When the arithmetic apparatus 200 performs a multiplying operation between integer data, the first partial data $A_i$ may be data corresponding to an upper N-bit digit of the data A, and the second partial data $A_q$ may be data corresponding to a lower N-bit digit of the data A. The third partial data $B_i$ may be data corresponding to an upper N-bit digit of the data B, and the fourth partial data $B_q$ may be data corresponding to a lower N-bit digit of the data B.

When the arithmetic apparatus 200 performs a multiplying operation between complex number data, the first partial data $A_i$ may be data corresponding to a real part of complex number data A, and the second partial data $A_q$ may be data corresponding to an imaginary part of the complex number data A. The third partial data $B_i$ may be data corresponding to a real part of complex number data B, and the fourth partial data $B_q$ may be data corresponding to an imaginary part of the complex number data B.

When the received bit data is a coefficient or N-bit data, the first partition unit 220 may not partition the bit data.

The first partition unit 220 provides the partial data which are partitioned or the bit data which is not partitioned to the multiplication unit 230.

The multiplication unit 230 performs a multiplying operation by combining the partial data according to an arithmetic operation command. For example, when the arithmetic apparatus 200 performs multiplication between integer data or perform multiplication between complex number data, the multiplication unit 230 generates first multiplication data $A_iB_i$ by multiplying the first partial data $A_i$ and the third partial data $B_i$, generates second multiplication data $A_qB_i$ by multiplying the second partial data $A_q$ and the third partial data $B_i$, generates third multiplication data $A_iB_q$ by multiplying the first partial data $A_i$ and the fourth partial data $B_q$, and generates fourth multiplication data $A_qB_q$ by multiplying the second partial data $A_q$ and the fourth partial data $B_q$.

In another example, when the arithmetic apparatus 200 performs multiplication between two complex numbers and a coefficient, the multiplication unit 230 generates first multiplication data $CA_i$ by multiplying the first partial data $A_i$ and a first weight C, generates second multiplication data $CA_q$ by multiplying the second partial data $A_q$ and the first weight C, generates third multiplication data $DB_i$ by multiplying the third partial data $B_i$ and a second weight D, and generates fourth multiplication data $DB_q$ by multiplying the fourth partial data $B_q$ and the second weight D. The first multiplication data, the second multiplication data, the third multiplication data, and the fourth multiplication data may be 2N-bit data.

The multiplication unit 230 may provide the first multiplication data and the fourth multiplication data to the addition unit 280, or to the CSA 250 and the CSA 260, respectively. The multiplication unit 230 provides the second multiplication data and the third multiplication data to the second partition unit 240. Although the multiplication unit 230 provides the second multiplication data and the third multiplication data to the second partition unit 240 in the embodiment illustrated in FIG. 2, this is merely an example for the sake of explanation. In other embodiments, for example, the first multiplication data and the fourth multiplication data may be provided to the second partition unit 240.

The second partition unit 240 partitions the second multiplication data and the third multiplication data. The second partition unit 240 may partition the multiplication data according to a bit-digit number. The second partition unit 240 may partition the 2N-bit multiplication data into two N-bit multiplication data. For example, the second partition unit 240 may partition the second multiplication data into N-bit first partition data $\alpha_1$ and N-bit second partition data $\alpha_2$, and may partition the third multiplication data into N-bit third partition data $\beta_1$ and N-bit fourth partition data $\beta_2$.

The second partition unit 240 provides the first partition data $\alpha_1$ and the third partition data $\beta_1$ to the CSA 250, and provides the second partition data $\alpha_2$ and the fourth partition data $\beta_2$ to the CSA 260.

The CSA 250 generates first carry data and first addition data by adding the first multiplication data, the first partition data, and the third partition data. The first carry data is generated during the adding process of the first multiplication data, the first partition data, and the third partition data.

The first carry data is shifted by 1 bit to reflect a carry. The first addition data is the sum of the first multiplication data, the first partition data, and the third partition data without the carry. For example, the CSA 250 generates first carry data $C_1$ and first addition data $S_1$ by adding the first multiplication data $A_iB_i$, the first partition data $\alpha_1$, and the third partition data $\beta_1$. The CSA 250 provides the first carry data and the first addition to the addition unit 280.

The CSA 260 generates second carry data and second addition data by adding the fourth multiplication data, the second partition data, and the fourth partition data. The second carry data is a carry which is generated during the adding process of the fourth multiplication data, the second partition data, and the fourth partition data. The second carry data is shifted by 1 bit to reflect a carry. The second addition data is the sum of the fourth multiplication data, the second partition data, and the fourth partition data without the carry. For example, the CSA 260 may generate second carry data $C_2$ and second addition data $S_2$ by adding the fourth multiplication data $A_qB_q$, the second partition data $\alpha_2$, and the fourth partition data $\beta_2$. The CSA 260 provides the second carry data and the second addition data to the addition unit 280.

The operation data generator 270 generates first operation data based on the fourth multiplication data and generates second operation data based on the third multiplication data according to a kind of arithmetic operation command. The operation data generator 270 determines whether to perform a NOT operation according to the kind of arithmetic operation command. When the operation data generator 270 performs the NOT operation according to the arithmetic operation command, the first operation data is data generated by performing the NOT operation with respect to the fourth multiplication data. When the operation data generator 270 does not perform the NOT operation according to the arithmetic operation command, the first operation data is the fourth multiplication data. When the operation data generator 270 performs the NOT operation according to the arithmetic operation command, the second operation data is data generated by performing the NOT operation with respect to the third multiplication data. When the operation data generator 270 does not perform the NOT operation according to the arithmetic operation command, the second operation data is the third multiplication data.

For example, when the arithmetic apparatus 200 performs a multiplying operation between 2N-bit integers (that is, the arithmetic operation command is a command to multiply 2N-bit integers), the operation data generator 270 does not perform the NOT operation with respect to the fourth multiplication data $A_qB_q$ and the third multiplication data $A_iB_q$, generates the first operation data $O_1$ with the fourth multiplication data $A_qB_q$, and generates the second operation data $O_2$ with the third multiplication data $A_iB_q$. In another example, when the arithmetic apparatus 200 performs a multiplying operation between 2N-bit complex numbers (that is, the arithmetic operation command is a command to multiply 2N-bit complex numbers), the operation data generator 270 generates the first operation data $O_1$ by performing the NOT operation with respect to the fourth multiplication data $A_qB_q$, but does not perform the NOT operation with respect to the third multiplication data $A_iB_q$, and generates the second operation data $O_2$ with the third multiplication data $A_iB_q$.

The operation data generator 270 provides the first operation data and the second operation data to the addition unit 280.

The addition unit 280 selects and/or adds the inputted data according to an arithmetic operation command.

The addition unit 280 generates a first output by adding two of the first multiplication data, the first operation data, the first carry data, and the first addition data according to an arithmetic operation command. The addition unit 280 selects two of the four data listed above based on the arithmetic operation command. For example, when the arithmetic apparatus 200 multiplies 2N-bit integers, the addition unit 280 generates the first output by adding the first carry data and the first addition data. When the arithmetic apparatus 200 multiplies 2N-bit complex numbers, the addition unit 280 generates the first output by adding the first multiplication data and the first operation data.

The addition unit 280 generates a second output by adding two of the second multiplication data, the second operation data, the second carry data, and the second addition data according to an arithmetic operation command. The addition unit 280 selects two of the four data listed above based on the arithmetic operation command. For example, when the arithmetic apparatus 200 multiplies 2N-bit integers, the addition unit 280 generates the second output by adding the second carry data and the second addition data. When the arithmetic apparatus 200 multiplies 2N-bit complex numbers, the addition unit 280 generates the second output by adding the second multiplication data and the second operation data.

The first output and the second output may be combined with each other according to an arithmetic operation command. For example, when the arithmetic apparatus 200 performs a multiplying operation between 2N-bit integers, the first output may be an upper 2N-bit part of a resulting value (4N bits) of the multiplying operation between the 2N-bit integers, and the second output may be a lower 2N-bit part of the resulting value (4N bits) of the multiplying operation between the 2N-bit integers.

The first output and the second output may be used as separate outputs according to an arithmetic operation command. For example, when the arithmetic apparatus 200 performs multiplying operations on two sets of N-bit integers simultaneously (that is, in parallel), the first output would be a resulting value of multiplying one set of N-bit integers, and the second output would be a resulting value of multiplying the other set of N-bit integers.

The embodiment of the present disclosure described above provides a single quintuplet arithmetic operation apparatus which is capable of performing multiple operations (for example, 2N multiplication, dual 2N multiplication, complex number and coefficient multiplication). Indeed, the arithmetic apparatus 200 according to various embodiments can perform multiplication of integers, complex numbers, and coefficients with a single arithmetic operation apparatus. On the assumption that N=32 bits, when independent arithmetic operation apparatuses are used, the independent arithmetic operations apparatuses should perform arithmetic operations as shown by Table 1 presented below:

TABLE 1

| Index | Independent arithmetic operation apparatus | Arithmetic operations |
|---|---|---|
| 1 | 32-bits multiplier 32-bits adder | 32-bits multiplying operation: 1 cycle 16 bits multiplying operation: 1 cycle 32 (I + Q) bits complex number multiplying operation: transform operation |

TABLE 1-continued

| Index | Independent arithmetic operation apparatus | Arithmetic operations |
|---|---|---|
| | | (5 cycles) + adding operation (2 cycles) + multiplying operation (2 cycles) |
| 2 | 16-bits multiplier 16-bit adder | 32-bits multiplying operation: multiplying operation (4 cycles) + transform operation (3 cycles) + adding operation (2 cycles) + multiplying operations (2 cycles) 16-bits multiplying: 1 cycle 32(I + Q) bits complex multiplying operation: multiplying operation (1 cycle) + transform operation (1 cycle) + adding operation (3 cycles) |
| 3 | Four 16-bits multiplier Four 16-bits adder | 32-bits multiplying operation: multiplying operation (4 cycles) + transform operation (3 cycles) + adding operation (2 cycles) + output transform operation (1 cycle→optional) |
| 4 | Index 1, 2, or 3's arithmetic operation apparatus + a dedicated complex number multiplier | 32 (I + Q) bit complex multiplying operation: 1 cycle 32/16 bits multiplying operation: consuming as a number of corresponding multiplier cycles |

When independent arithmetic operation apparatuses are implemented, the arithmetic operations shown in Table 1 may cause additional cycle consumption. In addition, when a 16-bit multiplying operation is performed using a 32-bit multiplier, the circuit for upper 16-bit multiplication is wasted as an unused resource. When a dedicated complex number multiplier is provided in parallel, the duty cycle of the multiplier may be reduced. In addition, dedicated complex number multipliers provided in parallel may occupy a large area and consume much power.

The arithmetic apparatus according to various embodiments can process the four scenarios shown in Table 1 in a single cycle. The arithmetic apparatus may include a CSA instead of a normal adder in order to perform intermediate addition rapidly and develop into various scenarios.

In addition, the arithmetic apparatus can perform multiplication between a complex number and a coefficient. That is, the arithmetic apparatus according to various embodiments may perform various arithmetic operations using a single arithmetic operation apparatus. In addition, the arithmetic apparatus according to various embodiments can reduce hardware complexity and improve the duty cycle and an execution speed. Moreover, the arithmetic apparatus may be implemented as a pipeline of plural stages to improve the overall performance.

The arithmetic apparatus according to various embodiments may include four N-bit multipliers, two 2N-bit CSAs, and adders, and may include MUX circuits for quintuplet multiplication, and circuits for transferring a carry. The N-bit multiplier may simply multiply the N-bit data which are selected in an input MUX circuit, and transmit the result of the multiplication. The CSAs may output a carry bit array and a sum bit array by adding the three input data. The adder may calculate a final resulting value by adding the carry bit array and the sum bit array.

Figure 3:
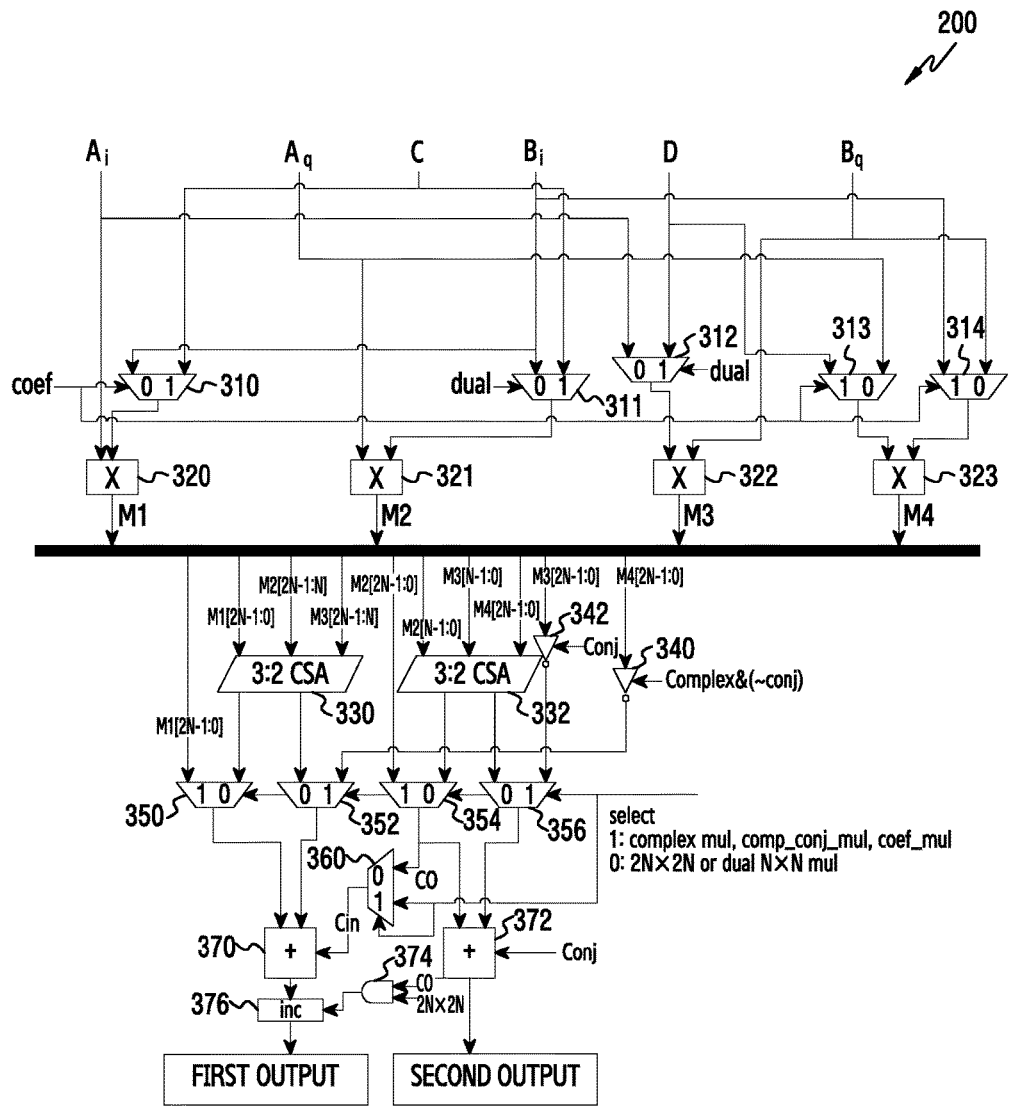
FIG. 3 illustrates a circuit configuration of an arithmetic apparatus according to various embodiments.

FIG. 3 illustrates a circuit configuration of an arithmetic apparatus according to various embodiments. The circuit configuration may be one possible implementation of the arithmetic apparatus 200 shown in FIG. 2.

Referring to FIG. 3, the arithmetic apparatus 200 may include a MUX 310, a MUX 311, a MUX 312, a MUX 313, a MUX 314, an N-bit multiplier 320, an N-bit multiplier 321, an N-bit multiplier 322, an N-bit multiplier 323, a CSA 330, a CSA 332, a NOT gate 340, a NOT gate 342, a MUX 350, a MUX 352, a MUX 354, a MUX 356, a MUX 360, a 2N-bit adder 370, a 2N-bit adder 372, an AND gate 374, and a compensator 376.

As discussed above, data A and B input to the arithmetic apparatus may be partitioned into first through fourth partial data. For example, when the arithmetic apparatus performs a multiplying operation between two 2N-bit integers A and B, the first partial data $A_i$ may be the upper N-bit part of a 2N-bit integer A, the second partial data $A_q$ may be the lower N-bit part of the 2N-bit integer A, the third partial data $B_i$ may be the upper N-bit part of a 2N-bit integer B, and the fourth partial data $B_q$ may be the lower N-bit part of the 2N-bit integer B. When the arithmetic apparatus 200 performs a multiplying operation between two 2N-bit complex numbers A and B, the first partial data $A_i$ may be the real part of a 2N-bit complex number A, the second partial data $A_q$ may be the imaginary part of the 2N-bit complex number A, the third partial data $B_i$ may be the real part of a 2N-bit complex number B, and the fourth partial data $B_q$ may be the imaginary part of the 2N-bit complex number B.

The data to be inputted to the arithmetic apparatus may include a coefficient, such as a coefficient which is multiplied by a complex number. The coefficient may be N-bit data. For example, the coefficient may be labelled or otherwise indicated by a C or D.

The respective MUXs 310-314 control the data inputted into one of the two inputs of each of multipliers 320-323 according to an arithmetic operation command. The respective MUXs 310-314 selects one of its own two inputs according to a coef value or a dual value which operates as the control input and is changed based on the arithmetic operation command, and provides the selected input to the multipliers 320-323. Specifically, coef is the control input for multipliers 310, 313, and 314, while dual is the control input for multipliers 311 and 312.

When multiplication between a complex number and a coefficient is performed, the coef value has a value of 1. When two N-bit integer multiplying operations are performed simultaneously or multiplication between a complex number and a coefficient is performed, the dual value has a value of 1. For example, when the coef value is 1 (that is, when multiplying a complex number and a coefficient), the MUX 310 may provide the coefficient C which matches the coef value from among the second partial data $A_q$ and the coefficients C to the multiplier 320.

When the dual value is 0 (that is, when the two N-bit integer multiplications are not performed simultaneously), the MUX 311 may provide the third partial data $B_i$ which matches the dual value from among the third partial data $B_i$ and the coefficients C to the multiplier 321.

The multipliers 320-323 generate first multiplication data to fourth multiplication data by multiplying their respective received inputs (for example, the first partial data through fourth partial data or coefficients). For example, when the coef value is 0, the multiplier 320 generates the first multiplication data M1 by multiplying the first partial data $A_i$ and the third partial data $B_i$ (that is, $M1=A_iB_i$). When the coef value is 1, the multiplier 320 generates the first multiplication data M1 by multiplying the first partial data $A_i$ and the coefficient C (that is, $M1=CA_i$).

The multipliers 320-323 provide the first through fourth multiplication data M1, M2, M3, and M4 to the MUX 350, the MUX 354, the CSA 330, the CSA 332, the NOT gate 340, and the NOT gate 342.

However, before being input to those components, 2N-bit second multiplication data M2 is partitioned into first partition data M2[2N−1:N] of an upper N-bit part and second partition data M2[N−1:0] of a lower N-bit part. The 2N-bit third multiplication data M3 is partitioned into third partition data M3[2N−1:N] of an upper N-bit part and fourth partition data M3[N−1:0] of a lower N-bit part.

The CSA 330 and the CSA 332 generate two data outputs by adding three data inputs. The generated data may be carry data and addition data. For example, the CSA 330 generates first carry data and first addition data by adding the 2N-bit first multiplication data M1, the N-bit first partition data M2[2N−1:N], and the N-bit third partition data M3[2N−1:N]. The CSA 332 generates second carry data and second addition data by adding the 2N-bit fourth multiplication data M4, the N-bit second partition data M2[N−1:0], and the N-bit fourth partition data M3[N−1:0].

The NOT gate 340 and the NOT gate 342 perform a NOT operation on the fourth multiplication data and the third multiplication data, respectively, according to an arithmetic operation command.

At the NOT gate 340, control input Complex may instruct the NOT gate 340 to perform its part in a complex number arithmetic operation. For example, when the arithmetic apparatus performs a complex number multiplying operation, the Complex value is 1. At the NOT gate 340, control input Conj may instruct NOT gate 340 (to perform its part) to multiply a complex number and a conjugate complex number. For example, when the arithmetic apparatus performs multiplication between a complex number and a conjugate complex number, the Conj value is 1. At the NOT gate, '~' means a NOT operation. For example, when the Conj value is 1, the ~Conj value is 0. At the NOT gate 340, '&' means an AND operation. For example, when the Complex value is 1 and the Conj value is 1 (that is, when the arithmetic operation command is a command to multiply a complex number and a conjugate complex number), the NOT gate 340 is not activated. This is because the control input "Complex & (~Conj)" for NOT gate 340 as shown in FIG. 3 is equal to 1 & (~1), that is, 0.

At the NOT gate 342, control input Conj may instruct to multiply a complex number and a conjugate complex number or not. For example, when the arithmetic apparatus 200 performs multiplication between a complex number and a conjugate complex number, the Conj value is 1. For example, when the Conj value is 0 (that is, when the arithmetic operation command is a command not to multiply a complex number and a conjugate complex number), the NOT gate 342 is not activated.

Each of MUX 350 through MUX 356 outputs one of the two inputted data according to an arithmetic operation command, and, more particularly, according to control input select, which may have a value of 1 or 0.

As shown in FIG. 3, next to the control input select, the terms "complex mul" indicates complex number multiplication, "comp_conj_mul" indicates multiplication between a complex number and a conjugate complex number, and "coef_mul" indicates multiplication between a complex number and a coefficient. Accordingly, when performing one operation from among complex number multiplication, multiplication between a complex number and a conjugate complex number, or multiplication between a complex number and a coefficient, the select value is 1, and the MUX 350 through MUX 356 each output the corresponding data.

As shown in FIG. 3, next to the control input select, the terms "2N×2N" refers to multiplication of two 2N-bit integers, and "dual N×N mul" refers to multiplications of two sets of two N-bit integers. When the select value is 0, the arithmetic apparatus is performing either multiplication between the 2N-bit integers or the 2 multiplication between the N-bit integers. When the select value is 0, the MUX 350 through MUX 356 each output data corresponding to their respective 0 inputs as shown in FIG. 3.

The MUX 360 outputs one of the select and an output CO (carry out) of the MUX 354 according to the select value. The output value of the MUX 360 is Cin (carry in) and is inputted to the adder 370. For example, when the select value is 0 (that is, when multiplication between the 2N-bit integers or 2 multiplication between the N-bit integers is being performed), the MUX 360 may output Cin and provide Cin to the adder 370.

The adder 370 adds the outputs of the MUX 350 and MUX 352 in accordance with control input Cin.

The adder 372 may generate a second output (Out 0 [2N−1:0]) by adding the output of the MUX 354 and the output of the MUX 356.

The AND gate 374 may determine an output according to the CO of the adder 372 and the 2N×2N multiplying operation. For example, when there exists a CO value in the adder 372 and the arithmetic apparatus is performing multiplication between 2N-bit integers, the AND gate 374 may output 1.

The compensator 376 may determine whether to apply the complementary number of 2 according to the output of the AND gate 374. For example, when the AND gate 374 outputs 1, the compensator 376 may output a first output (Out 1 [4N−1:2N] by applying the complementary number of 2 to the output of the adder 370.

As shown in FIG. 3, the arithmetic apparatus 200 according to various embodiments of the present disclosure may perform various arithmetic operations. In addition, those various arithmetic operations may be performed through a single cycle. Moreover, an arithmetic apparatus according to the present disclosure may perform the various arithmetic operations over a plurality of cycles to improve performance.

Figure 4:
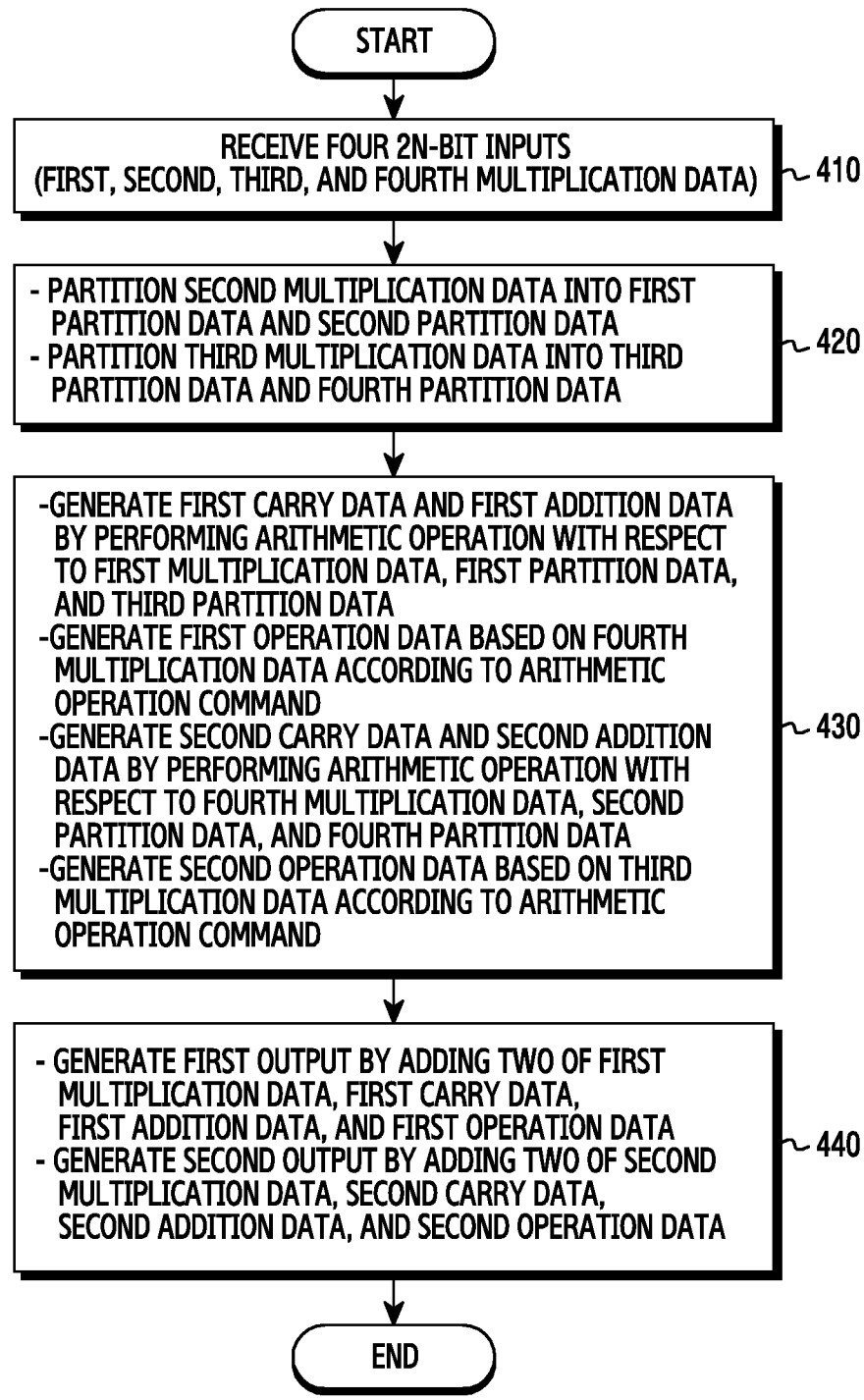
FIG. 4 is a flowchart of an operating method of an arithmetic apparatus according to various embodiments.

FIG. 4 is a flowchart of an operating method for an arithmetic apparatus according to various embodiments. The operation may be performed by, for example, the arithmetic apparatus 200 shown in FIG. 2.

Referring to FIG. 4, in step 410, the arithmetic apparatus 200 may receive four 2N-bit inputs. The four 2N-bit inputs may be first multiplication data, second multiplication data, third multiplication data, and fourth multiplication data.

In step 420, the arithmetic apparatus 200 may partition the second multiplication data into first partition data and second partition data, and may partition the third multiplication data into third partition data and fourth partition data. The dividing operations may be operations for inputting the partitioned data to the CSA 330 or the CSA 332 illustrated in FIG. 3.

In step 430, the arithmetic apparatus 200 may generate first carry data and first addition data by performing an arithmetic operation with respect to the first multiplication data, the first partition data, and the third partition data. The arithmetic apparatus 200 may generate first operation data based on the fourth multiplication data according to an arithmetic operation command. For example, the arithmetic operation command may be one of multiplication between 2N-bit integers, 2 multiplication between N-bit integers, complex number multiplication, multiplication between a complex number and a conjugate complex number, and multiplication between a complex number and a coefficient. The operation of generating the first operation data may include an operation of generating the first operation data with the fourth multiplication data, and an operation of generating the first operation data by performing a NOT operation with respect to the fourth multiplication data. The arithmetic apparatus 200 may generate second carry data and second addition data by performing an arithmetic operation with respect to the fourth multiplication data, the second partition data, and the fourth partition data. The arithmetic apparatus 200 may generate the second operation data based on the third multiplication data according to an arithmetic operation command. The operation of generating the second operation data may include an operation of generating the second operation data with the third multiplication data, and an operation of generating the second operation data by performing a NOT operation with respect to the third multiplication data.

In step 440, the arithmetic apparatus 200 may generate a first output by adding two of the first multiplication data, the first carry data, the first addition data, and the first operation data according to the arithmetic operation command. The arithmetic apparatus 200 may generate a second output by adding two of the second multiplication data, the second carry data, the second addition data, and the second operation data according to the arithmetic operation command.

Figure 5A:
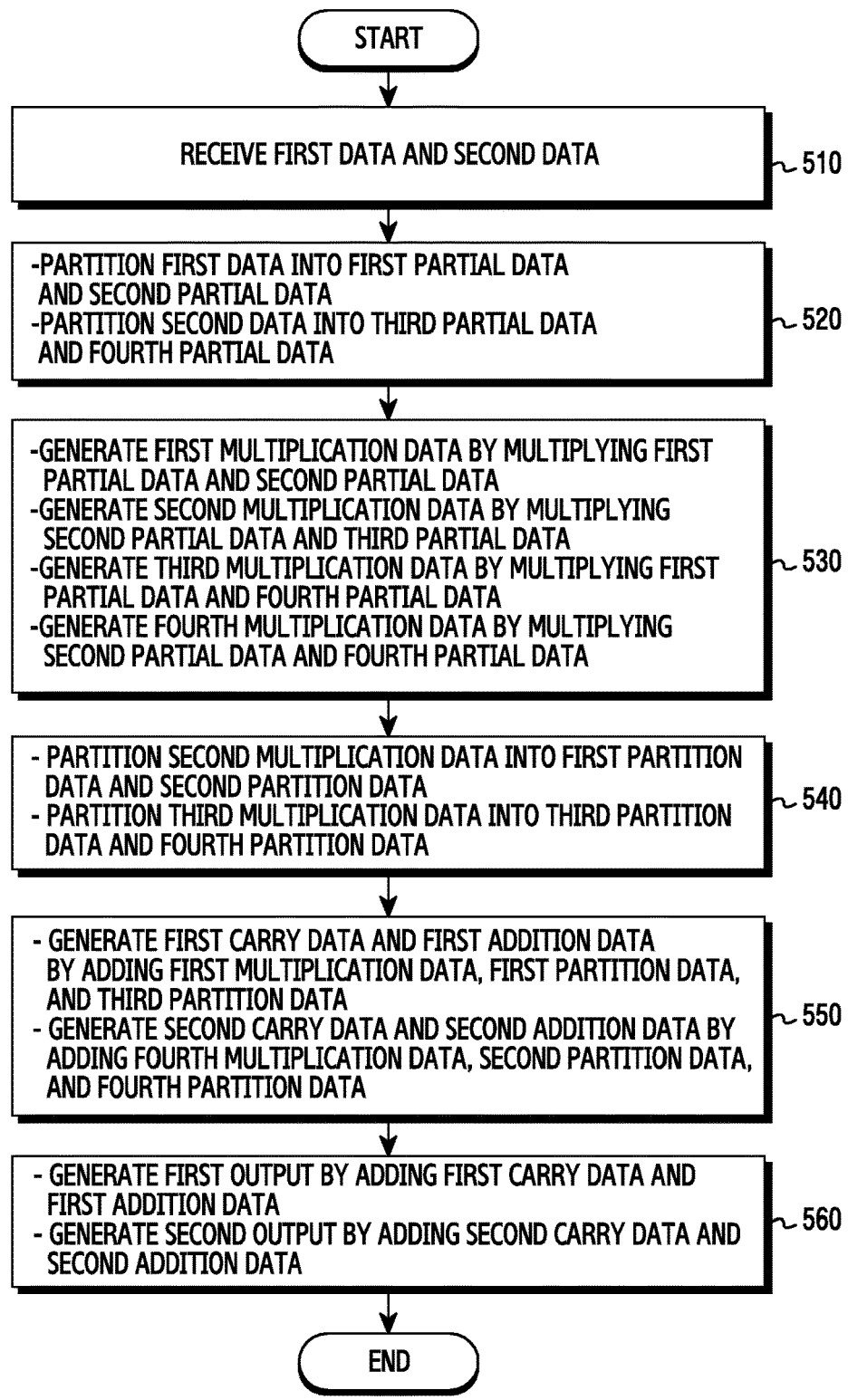
FIG. 5A is a flowchart of an operating method for an arithmetic apparatus according to a first embodiment.

FIG. 5A is a flowchart of an operating method for an arithmetic apparatus to multiply two 2N-bit integers according to a first embodiment. Such an operation may be performed by, for example, the arithmetic apparatus 200 shown in FIG. 2.

Referring to FIG. 5A, the arithmetic apparatus performs the arithmetic operations shown in Equation (2) below through the operations of steps 510 through 560:

$$A = A_i + A_q$$

$$B = B_i + B_q$$

$$A \times B = (A_i + A_q) \times (B_i + B_q) = A_i B_i + A_q B_i + A_i B_q + A_q B_q \quad (2)$$

A is first data having a 2N-bit size, and B is second data having a 2N-bit size. $A_i$ is first partial data which is partitioned from the first data, and $A_q$ is second partial data which is partitioned from the first data. $A_i$ may correspond to an upper N bits of A and $A_q$ may correspond to a lower N bits of A. $B_i$ is third partial data which is partitioned from the second data, and $B_q$ is fourth partial data which is partitioned from the second data. $B_i$ may correspond to an upper N bits of B and $B_q$ may correspond to a lower N bits of B. $A_i B_i$ is first multiplication data, $A_q B_i$ is second multiplication data, $A_i B_q$ is third multiplication data, and $A_q B_q$ is fourth multiplication data.

In step 510, the arithmetic apparatus receives the first data A and the second data B. The first data and the second data are each 2N-bit integers.

In step 520, the arithmetic apparatus (a) partitions the first data A into the first partial data $A_i$ and the second partial data $A_q$, and (b) partitions the second data B into the third partial data $B_i$ and the fourth partial data $B_q$. Each of the first through the fourth partial data have an N-bit size.

In step 530, the arithmetic apparatus (a) generates the first multiplication data M1 by multiplying the first partial data $A_i$ and the third partial data $B_i$, (b) generates the second multiplication data M2 by multiplying the second partial data $A_q$ and the third partial data $B_i$, (c) generates the third multiplication data M3 by multiplying the first partial data $A_i$ and the fourth partial data $B_q$, and (d) generates the fourth multiplication data M4 by multiplying the second partial data $A_q$ and the fourth partial data $B_q$.

In step 540, the arithmetic apparatus (a) partitions the second multiplication data M2 ($=A_q B_i$) into first partition data and second partition data, and (b) partitions the third multiplication data M3 ($=A_i B_q$) into third partition data and fourth partition data. The first partition data is the upper N-bit part of $A_q B_i$, and the second partition data is the lower N-bit part of $A_q B_i$, the third partition data is the upper N-bit part of $A_i B_q$ and the fourth partition data is the lower N-bit part of $A_i B_q$.

In step 550, the arithmetic apparatus (a) generates first carry data and first addition data by adding the first multiplication data M1 ($=A_i B_i$), the first partition data, and the third partition data, and (b) generates second carry data and second addition data by adding the fourth multiplication data M4 ($=A_q B_q$), the second partition data, and the fourth partition data.

In step 560, the arithmetic apparatus (a) generates a first output by adding the first carry data and the first addition data, and (b) generates a second output by adding the second carry data and the second addition data.

Although not shown in FIG. 5A, in other embodiments, the first output and the second output may be added by carrying the first output by 2N bits. The sum of the carried first output and the second output would be the result of the multiplication between the two 2N-bit integers.

Figure 5B:
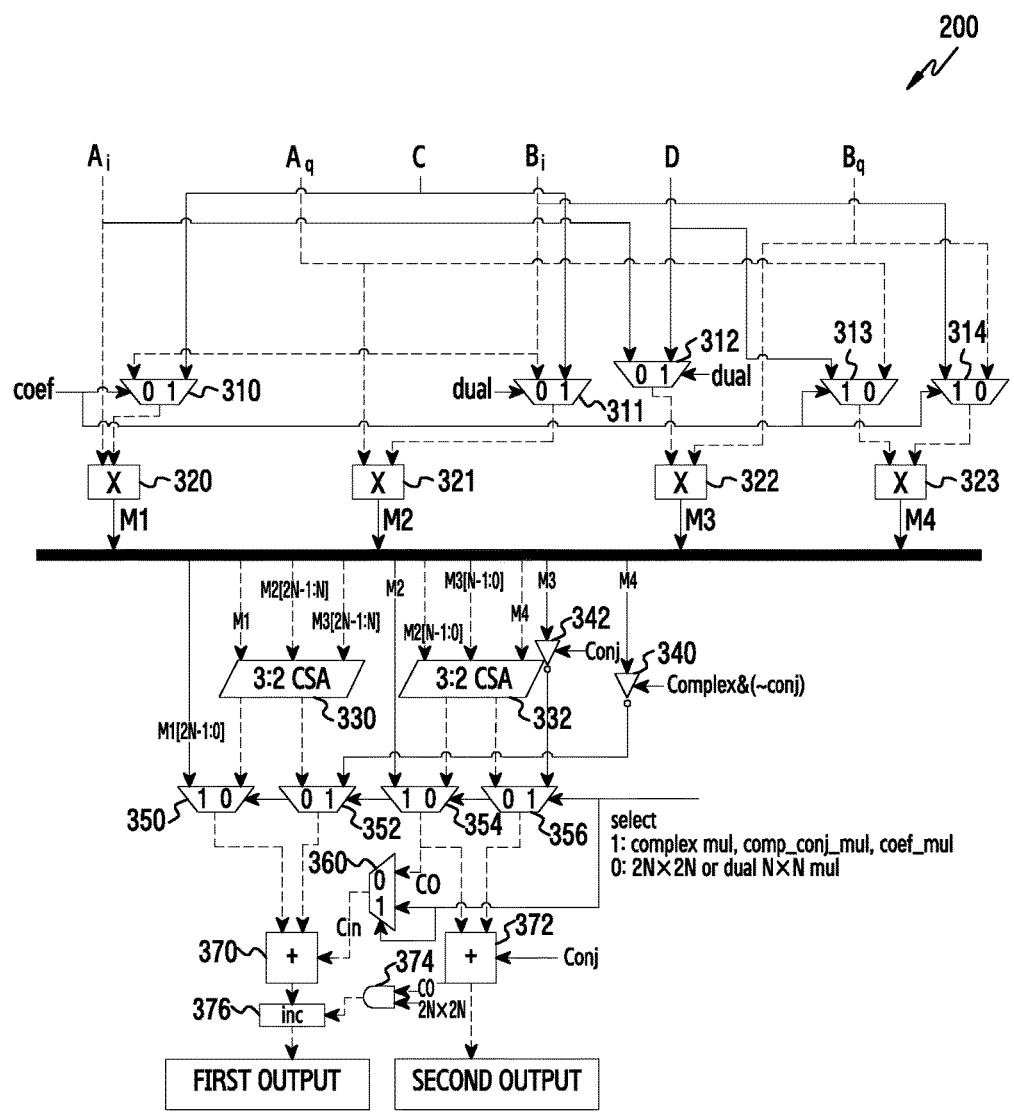
FIG. 5B illustrates a circuit configuration of the arithmetic apparatus according to the first embodiment.

FIG. 5B illustrates a circuit configuration of the arithmetic apparatus according to the first embodiment. In FIG. 5B, the components and connections are the same as FIG. 3, but the control inputs are changed in order to perform multiplication of two 2N-bit integers.

Arithmetic apparatus 200 in FIG. 5B can perform multiplication of two 2N-bit integers. In this case, the coef value is 0, the dual value is 0, the conj value is 0, the complex value is 0, and the select value is 0. The input (shown at top) is first partial data $A_i$, second partial data $A_q$, third partial data $B_i$, and fourth partial data $B_q$.

Because the values for coef and dual are 0, multipliers 320-323 generate first multiplication data M1 by multiplying the first partial data and the second partial data (M1=$A_i B_i$), generate second multiplication data M2 by multiplying the second partial data and the third partial data (M2=$A_q B_i$), generate third multiplication data M3 by multiplying the first partial data and the fourth partial data (M3=$A_i B_q$), and generate fourth multiplication data M4 by multiplying the second partial data and the fourth partial data (M4=$A_q B_q$).

The second multiplication data M2 is partitioned into first partition data M2[2N−1:N] and second partition data M2[N−1:0], and the third multiplication data M3 is partitioned into third partition data M3[2N−1:N] and fourth partition data M3[N−1:0].

The CSA 330 generates first carry data and first addition data by adding the first multiplication data M1, the first partition data M2[2N−1:N], and the third partition data M3[2N−1:N]. The CSA 332 generates second carry data and second addition data by adding the fourth multiplication data M4, the second partition data M2[N−1:0], and the fourth partition data M3[N−1:0].

The adder 370 adds the first carry data and the first addition data. When a carry is generated by addition in the CSA 332, the adder 370 may add the first carry data and first addition data by using Cin. The compensator 376 generates a first output by compensating for the added value.

The adder 372 generates a second output by adding the second carry data and the second addition data.

In this embodiment, the first output is the upper 2N-bit part of the result of the multiplication of the two 2N-bit integers, and the second output is the lower 2N-bit part of the result of the multiplication between the two 2N-bit integers.

Figure 6A:
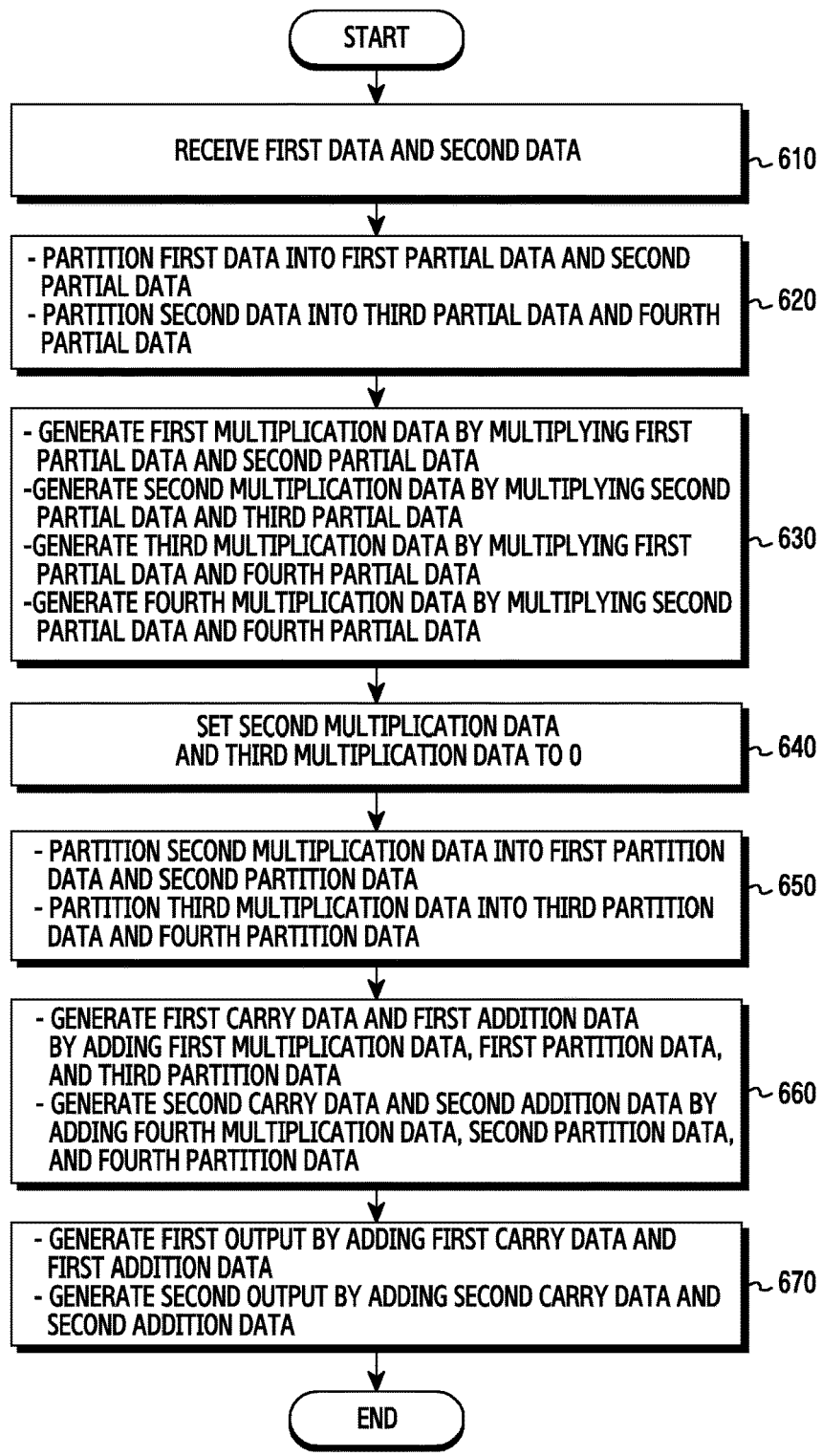
FIG. 6A is a flowchart of an operating method for an arithmetic apparatus according to a second embodiment.

FIG. 6A is a flowchart of an operating method for an arithmetic apparatus to perform multiplications of two sets of two N-bit integers simultaneously according to a second embodiment. Such an operation may be performed by, for example, the arithmetic apparatus 200 shown in FIG. 2.

Through steps 610 through 670 in FIG. 6A, the arithmetic apparatus performs the arithmetic operations shown in Equation (3) below:

$$A = A_i + A_q$$

$$B = B_i + B_q$$

$$A_i \times B_i = A_i B_i$$

$$A_q \times B_q = A_q B_q \quad (3)$$

As before, first data A has a 2N-bit size, and second date B has a 2N-bit size. From A, $A_i$ is first partial data of N-bit size and $A_q$ is second partial data of N-bit size. Similarly, third partial data $B_i$ has an N-bit size and fourth partial data $B_q$ has an N-bit size. $A_i B_i$ is first multiplication data M1, $A_q B_i$ is second multiplication data M2, $A_i B_q$ is third multiplication data M3, and $A_q B_q$ is fourth multiplication data M4.

In step 610, the first data A and the second data B are received. The first data and the second data are 2N-bit integers. Each of the first data and the second data is a combination of two different N-bit integers to be inputted to the arithmetic apparatus.

In step 620, the arithmetic apparatus (a) partitions the first data A into the first partial data $A_i$ and the second partial data $A_q$, and (b) partitions the second data B into the third partial data $B_i$ and the fourth partial data $B_q$. Each of the first through fourth partial data have an N-bit size.

In step 630, the arithmetic apparatus (a) generates the first multiplication data M1 by multiplying the first partial data and the second partial data, (b) generates the second multiplication data M2 by multiplying the second partial data and the third partial data, (c) generates the third multiplication data M3 by multiplying the first partial data and the fourth partial data, and (d) generates the fourth multiplication data M4 by multiplying the second partial data and the fourth partial data.

In step 640, the arithmetic apparatus sets the second multiplication data M2 and the third multiplication data M3 to 0. This step may not be performed separately at all. For example, setting M2 and M3 to 0 is performed when M2 and M3 are generated (i.e., replacing steps 630(b) and 630(c) above) in the embodiment shown in FIG. 6B below.

In step 650, the arithmetic apparatus (a) partitions the second multiplication data M2 into first partition data and second partition data, and (b) partitions the third multiplication data M3 into third partition data and fourth partition data. Since the second multiplication data M2 is set to 0, the first partition data is 0 and the second partition data is 0. Since the third multiplication data M3 is set to 0, the third partition data is 0 and the fourth partition data is 0.

In step 660, the arithmetic apparatus (a) generates first carry data and first addition data by adding the first multiplication data M1, the first partition data (=0), and the third partition data (=0), and (b) generates second carry data and second addition data by adding the fourth multiplication data M4, the second partition data (=0), and the fourth partition data (=0).

In step 670, the arithmetic apparatus (a) generates a first output by adding the first carry data and the first addition data, and (b) generates a second output by adding the second carry data and the second addition data. In this embodiment, the first output is the first multiplication data M1. This is because the second multiplication data M2 and the third multiplication data M3 are set to 0, and thus the sum of the first carry data and the first addition data is equal to the first multiplication data M1. Similarly, the second output is the fourth multiplication data M4 because the second and third multiplication data M2 and M3 are set to 0, and thus the sum of the second carry data and the second addition data is equal to the fourth multiplication data M4.

Figure 6B:
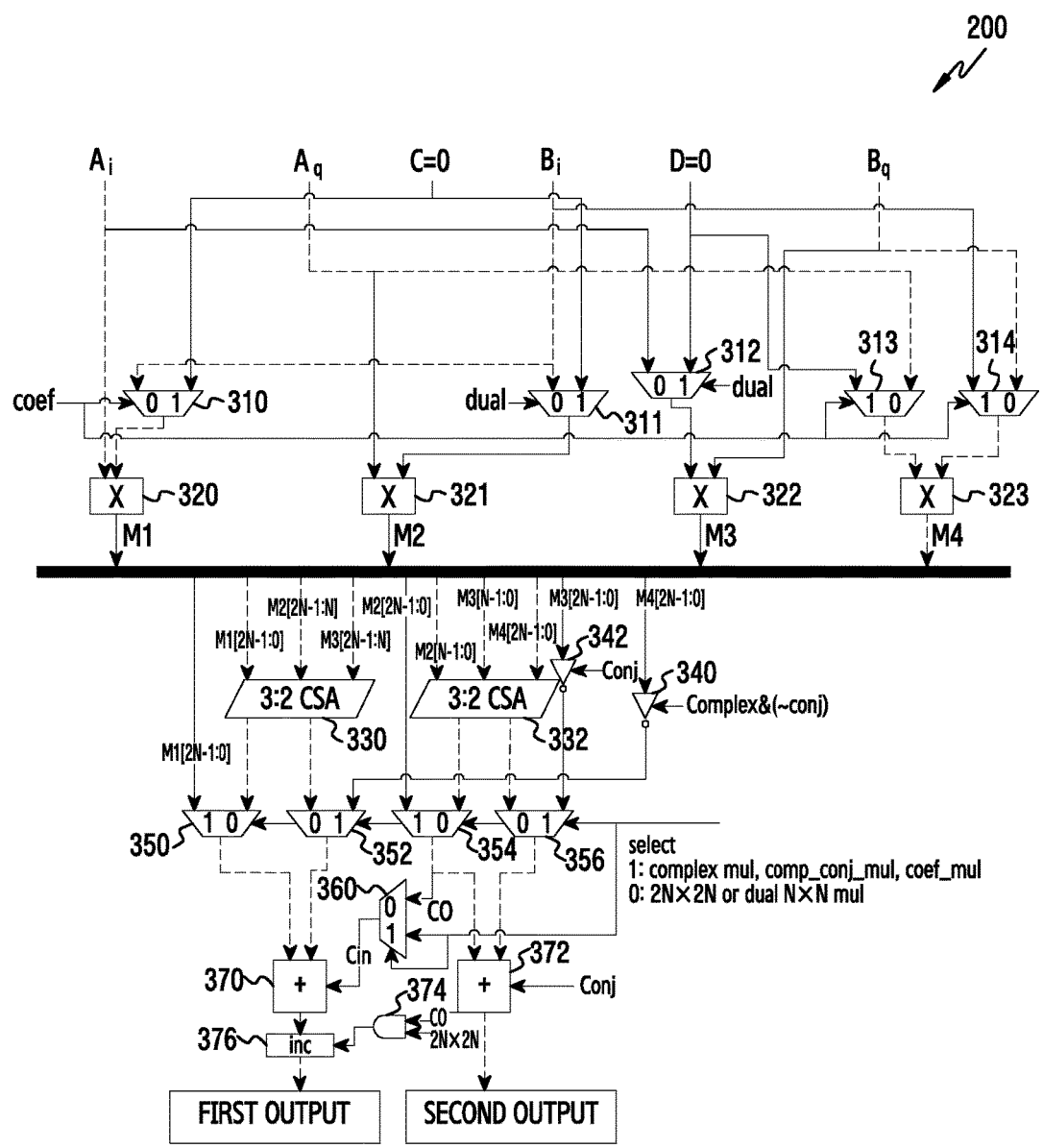
FIG. 6B illustrates a circuit configuration of the arithmetic apparatus according to the second embodiment.

FIG. 6B illustrates a circuit configuration of the arithmetic apparatus according to the second embodiment. In FIG. 6B, the components and connections are the same as FIGS. 3 and 5B, but the control inputs are changed in order to perform multiplication of two sets of two N-bit integers simultaneously.

For the arithmetic apparatus to perform 2 multiplications of two N-bit integers at the same time, the coef value is 0, the dual value is 1, the conj value is 0, the complex value is 0, and the select value is 0. Moreover, coefficients C and D are set to 0.

Because coef=0, multiplier 320 generates first multiplication data M1 by multiplying the first partial data $A_i$ and the third partial data $B_i$, and multiplier 323 generates fourth multiplication data M4 by multiplying the second partial data $A_q$ and the fourth partial data $B_q$. However, because the dual value is 1, coefficients C and D having a value of 0 are output from the MUX 311 and the MUX 312, and are provided as input to multipliers 321 and 322, resulting in both of their outputs, M2 and M3, respectively, being 0.

The second multiplication data M2 is partitioned into first partition data M2[2N−1:N] and second partition data M2[N−1:0], and the third multiplication data M3 is partitioned into third partition data M3[2N−1:N] and fourth partition data M3[N−1:0]. Of course, all three have a value of 0.

The CSA 330 generates first carry data and first addition data by adding the first multiplication data M1, the first partition data M2[2N−1:N], and the third partition data M3[2N−1:N]. The CSA 332 generates second carry data and second addition data by adding the fourth multiplication data M4, the second partition data M2[N−1:0], and the fourth partition data M3[N−1:0].

The adder 370 generates a first output by adding the first carry data and the first addition data, and adder 372 generates a second output by adding the second carry data and the second addition data.

The first output is an arithmetic value of one multiplication between N-bit integers from among the 2 multiplication, and the second output is an arithmetic value of the multiplying operation between other N-bit integers from among the 2 multiplication.

Figure 7A:
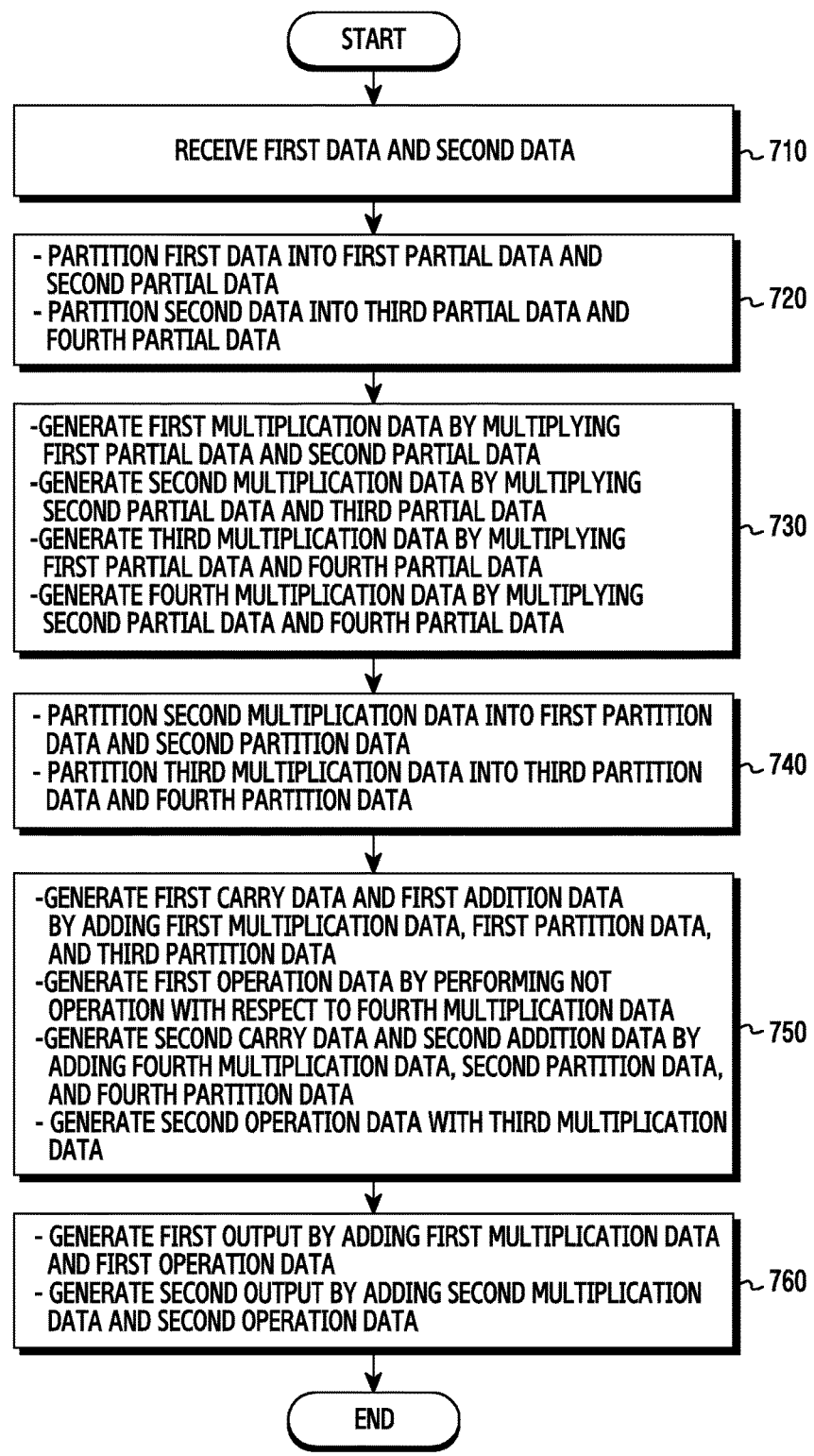
FIG. 7A is a flowchart of an operating method for an arithmetic apparatus according to a third embodiment.

FIG. 7A is a flowchart of an operating method for an arithmetic apparatus to multiply complex numbers according to a third embodiment. Such an operation may be performed by, for example, the arithmetic apparatus 200 shown in FIG. 2.

In steps 710 to 760 of FIG. 7A, the arithmetic operations shown in Equation (4) below are performed:

$$A = A_i + jA_q$$

$$B = B_i + jB_q$$

$$A \times B = (A_i + jA_q) \times (B_i + jB_q) = A_i B_i - A_q B_q + j(A_q B_i + A_i B_q) \quad (4)$$

In this embodiment, first partial data $A_i$ corresponds to the real part of A and second partial data $A_q$ corresponds to the imaginary part of A. Third partial data $B_i$ corresponds to the real part of B and fourth partial data $B_q$ corresponds to the imaginary part of B.

In step 710, the first data A and the second data B, each comprising a 2N-bit complex number, are received.

In step 720, the arithmetic apparatus (a) partitions the first data into the first partial data $A_i$ and the second partial data $A_q$, and (b) partitions the second data into the third partial data $B_i$ and the fourth partial data $B_q$. Each of the first through fourth partial data have an N-bit size.

In step 730, the arithmetic apparatus (a) generates the first multiplication data M1 by multiplying the first partial data $A_i$ and the third partial data $B_i$, (b) generates the second multiplication data M2 by multiplying the second partial data $A_q$ and the third partial data $B_i$, (c) generates the third multiplication data M3 by multiplying the first partial data $A_i$ and the fourth partial data $B_q$, and (d) generates the fourth multiplication data M4 by multiplying the second partial data $A_q$ and the fourth partial data $B_q$.

In step 740, the arithmetic apparatus (a) partitions the second multiplication data M2 into first partition data and second partition data, and (b) partitions the third multiplication data M3 into third partition data and fourth partition data.

In step 750, the arithmetic apparatus (a) generates first carry data and first addition data by adding the first multiplication data, the first partition data, and the third partition data, (b) generates first operation data $O_1$ by performing a NOT operation with respect to the fourth multiplication data M4. The NOT operation is performed because $A_q B_q$ in the resulting value of the arithmetic operation between the complex numbers has a negative value.

Continuing in step 750, the arithmetic apparatus (c) generates second carry data and second addition data by adding the fourth multiplication data M4, the second partition data, and the fourth partition data, and (d) generates second operation data $O_2$ with the third multiplication data M3. This is because the third multiplication data has a positive value.

In step 760, the arithmetic apparatus (a) generates a first output by adding the first multiplication data M1 and the first operation data $O_1$, and (b) generates a second output by adding the second multiplication data M2 and the second operation data $O_2$. The first output is the real part of the value resulting from the multiplication between the two complex numbers, and the second output is the imaginary part of the value resulting from the multiplication of the two complex numbers.

Figure 7B:
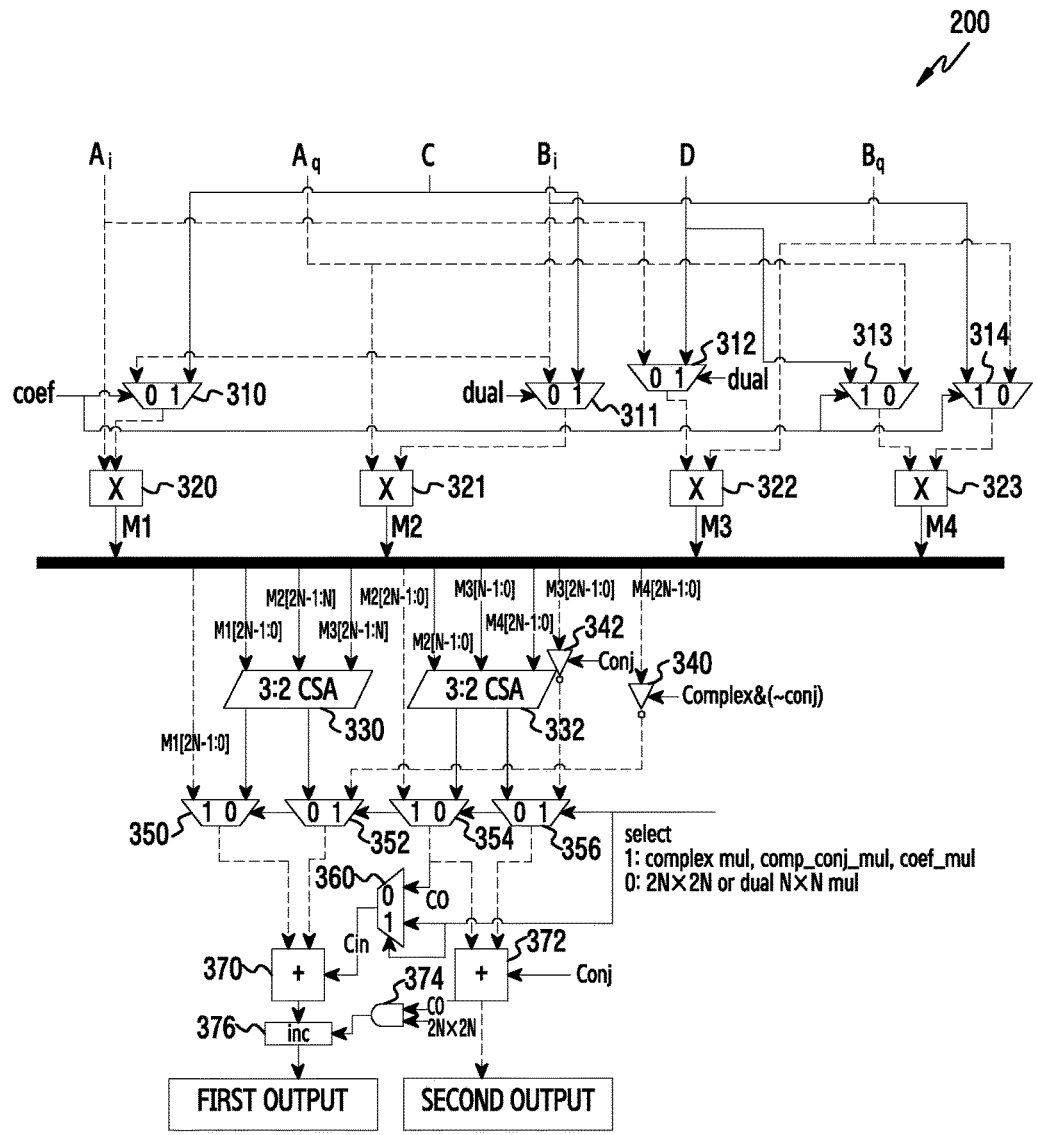
FIG. 7B illustrates a circuit configuration of the arithmetic apparatus according to the third embodiment.

FIG. 7B illustrates a circuit configuration of the arithmetic apparatus according to the third embodiment. In FIG. 7B, the components and connections are the same as FIGS. 3, 5B, and 6B, but the control inputs are changed in order to perform multiplication of two 2N-bit complex numbers.

When performing multiplication between two 2N-bit complex numbers, the values should be set as follows: the coef value is 0, the dual value is 0, the conj value is 0, the complex value is 1, and the select value is 1.

As above, multipliers 320-323 generate first multiplication data M1 by multiplying the first partial data and the second partial data, generate second multiplication data M2 by multiplying the second partial data and the third partial data, generate third multiplication data M3 by multiplying the first partial data and the fourth partial data, and generate fourth multiplication data M4 by multiplying the second partial data and the fourth partial data.

Because select=1 and complex=1, the outputs of CSA 330 and CSA 332 are not used by MUXs 350 through 356 and can be ignored.

Because complex=1, the NOT gate 340 generates first operation data $O_1$ by performing a NOT operation with respect to the fourth multiplication data M4. The NOT operation is performed because $A_q B_q$ (=M4) in the resulting value of the multiplication between the complex numbers has a negative value. The NOT gate 342 generates second operation data $O_2$ with the third multiplication data M3. This is because the imaginary part of the arithmetic operation between the complex numbers does not include a negative value.

The adder 370 generates a first output by adding the first multiplication data M1 and the first operation data $O_1$ (=−M4). Accordingly, the first output is M1−M4, the real part of the result of multiplying two 2N-bit complex numbers.

The adder 372 generates a second output by adding the second multiplication data M2 and the second operation data $O_2$ (=+M3). Accordingly, the second output is M2+M3, the imaginary part of the result of multiplying two 2N-bit complex numbers.

Figure 8A:
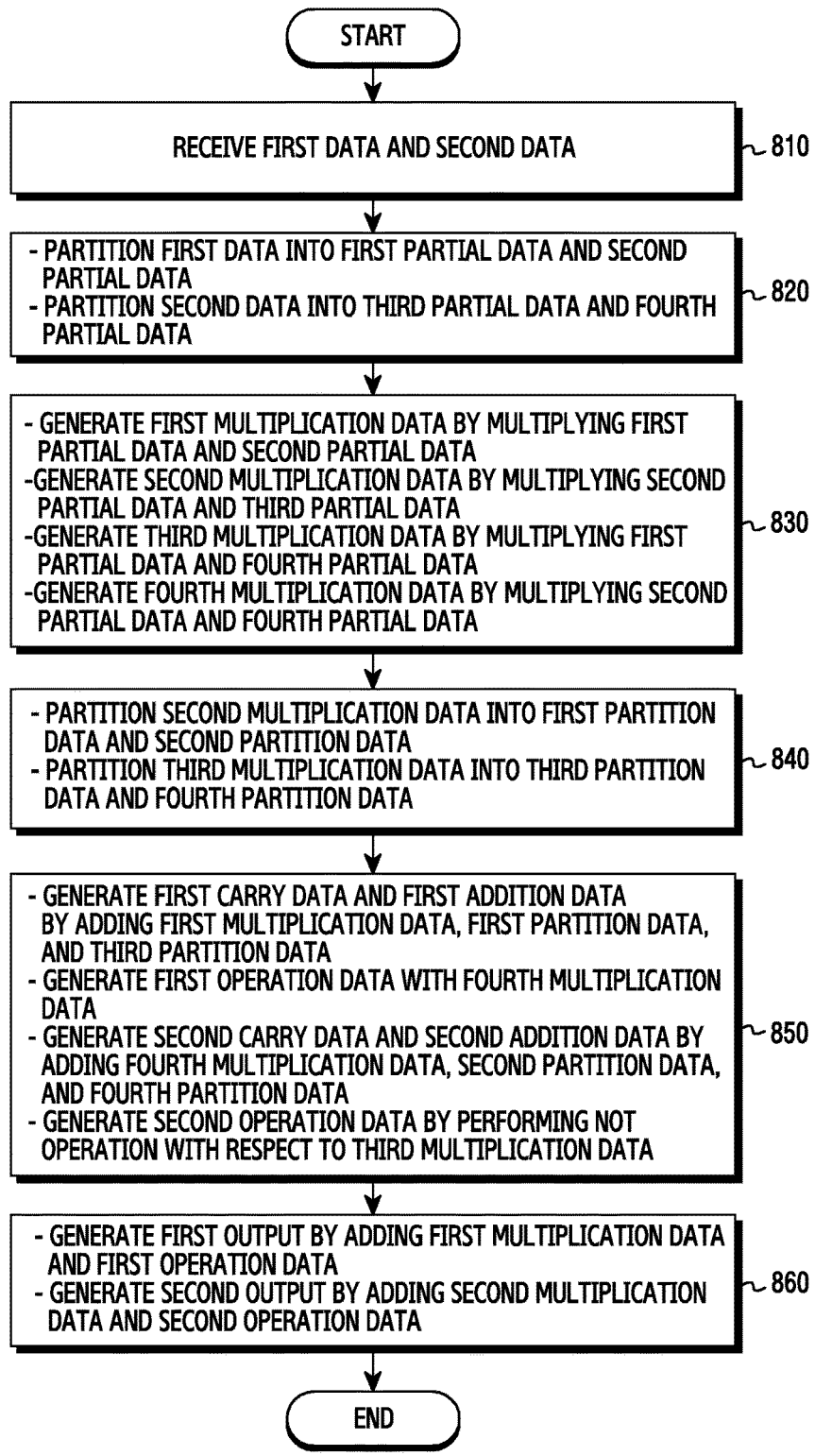
FIG. 8A is a flowchart of an operating method for an arithmetic apparatus according to a fourth embodiment.

FIG. 8A is a flowchart of an operating method for an arithmetic apparatus to multiply a complex number and a conjugate complex number according to a fourth embodiment. Such an operation may be performed by, for example, the arithmetic apparatus 200 shown in FIG. 2.

The arithmetic operations shown in Equation (5) below are performed through steps 810 to 860 of FIG. 8A:

$$A = A_i + jA_q$$

$$B = B_i + jB_q$$

$$A \times \tilde{B} = (A_i + jA_q) \times (B_i - jB_q) = A_i B_i + A_q B_q + j(A_q B_i - A_i B_q) \quad (5)$$

$\tilde{B}$ is a conjugate complex number of B. The other values remain the same.

In step 810, the first data and the second data are received. The first data is a 2N-bit complex number and the second data is a 2N-bit complex conjugate number.

Steps 820, 830, and 840 are substantially similar to steps 720, 730, and 740 of FIG. 7A and need not be described again.

In step 850(a), first carry data and first addition data are generated by adding the first multiplication data, the first partition data, and the third partition data. In step 850(b), first operation data is generated with the fourth multiplication data. This is because the fourth multiplication data has a positive value.

In step 850(c), second carry data and second addition data are generated by adding the fourth multiplication data, the second partition data, and the fourth partition data. In step 850(d), second operation data is generated by performing a NOT operation with respect to the third multiplication data. The NOT operation is performed because $A_i B_q$ in the resulting value of the arithmetic operation between the complex numbers has a negative value.

In step 860, (a) a first output is generated by adding the first multiplication data and the first operation data, and (b) a second output is generated by adding the second multiplication data and the second operation data. The first output is the real part of the resulting value of the multiplication of the complex numbers, and the second output is the imaginary part of the resulting value of the multiplication of the complex numbers.

Figure 8B:
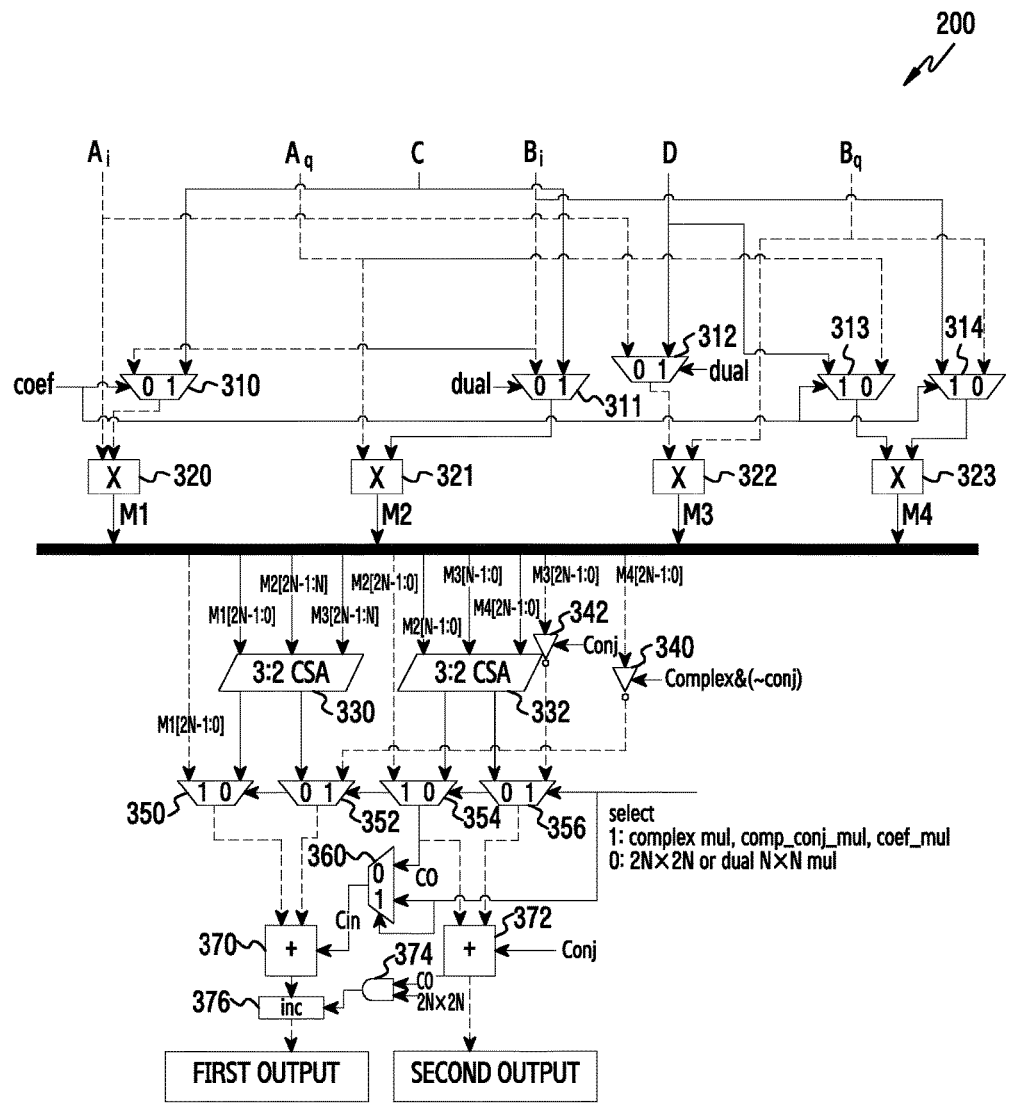
FIG. 8B illustrates a circuit configuration of the arithmetic apparatus according to the fourth embodiment.

FIG. 8B illustrates a circuit configuration in the arithmetic apparatus according to the fourth embodiment. In FIG. 8B, the components and connections are the same as FIGS. 3, 5B, 6B, and 7B, but the control inputs are changed in order to perform multiplication of a 2N-bit complex number by a 2N-bit complex conjugate number.

When performing multiplication of a 2N-bit complex number and a 2N-bit conjugate complex number, the following settings should be used: the coef value is 0, the dual value is 0, the conj value is 1, the complex value is 1, and the select value is 1.

As before, multipliers 320-323 generate first multiplication data M1 by multiplying the first partial data and the second partial data, generate second multiplication data M2 by multiplying the second partial data and the third partial data, generate third multiplication data M3 by multiplying the first partial data and the fourth partial data, and generate fourth multiplication data M4 by multiplying the second partial data and the fourth partial data.

As before, because select=1 and complex=1, the outputs of CSA 330 and CSA 332 are not used by MUXs 350 through 356 and can be ignored Because complex=1, conj=1, and the control input for gate 340 is Complex&(~conj), the NOT gate 340 generates first operation data $O_1$ with the fourth multiplication data M4 without performing a NOT operation. This is because the real part of the multiplication between the complex number and the conjugate complex number is positive.

Because the control input for gate 342 is set (conj=1), the NOT gate 342 generates second operation data $O_2$ by performing a NOT operation with respect to the third multiplication data M3. The NOT operation is performed because $A_iB_q$ in the resulting value of the multiplication between the complex numbers has a negative value.

The adder 370 generates a first output by adding the first multiplication data M1 and the first operation data $O_1$ (=+M4). Accordingly, the first output is M1+M4, the real part of the result of multiplying a 2N-bit complex number by a 2-bit complex conjugate number.

The adder 372 generates a second output by adding the second multiplication data M2 and the second operation data $O_2$ (=−M3). Accordingly, the second output is M2−M3, the imaginary part of the result of multiplying a 2N-bit complex number by a 2-bit complex conjugate number. The adder 372 may change a carry input in order to process a 2's complementary number when necessary.

The first output may be a real part of an arithmetic value of the multiplication between the 2N-bit complex number and conjugate complex number, and the second output may be an imaginary part of the arithmetic value of the multiplication between the 2N-bit complex number and conjugate complex number.

Figure 9A:
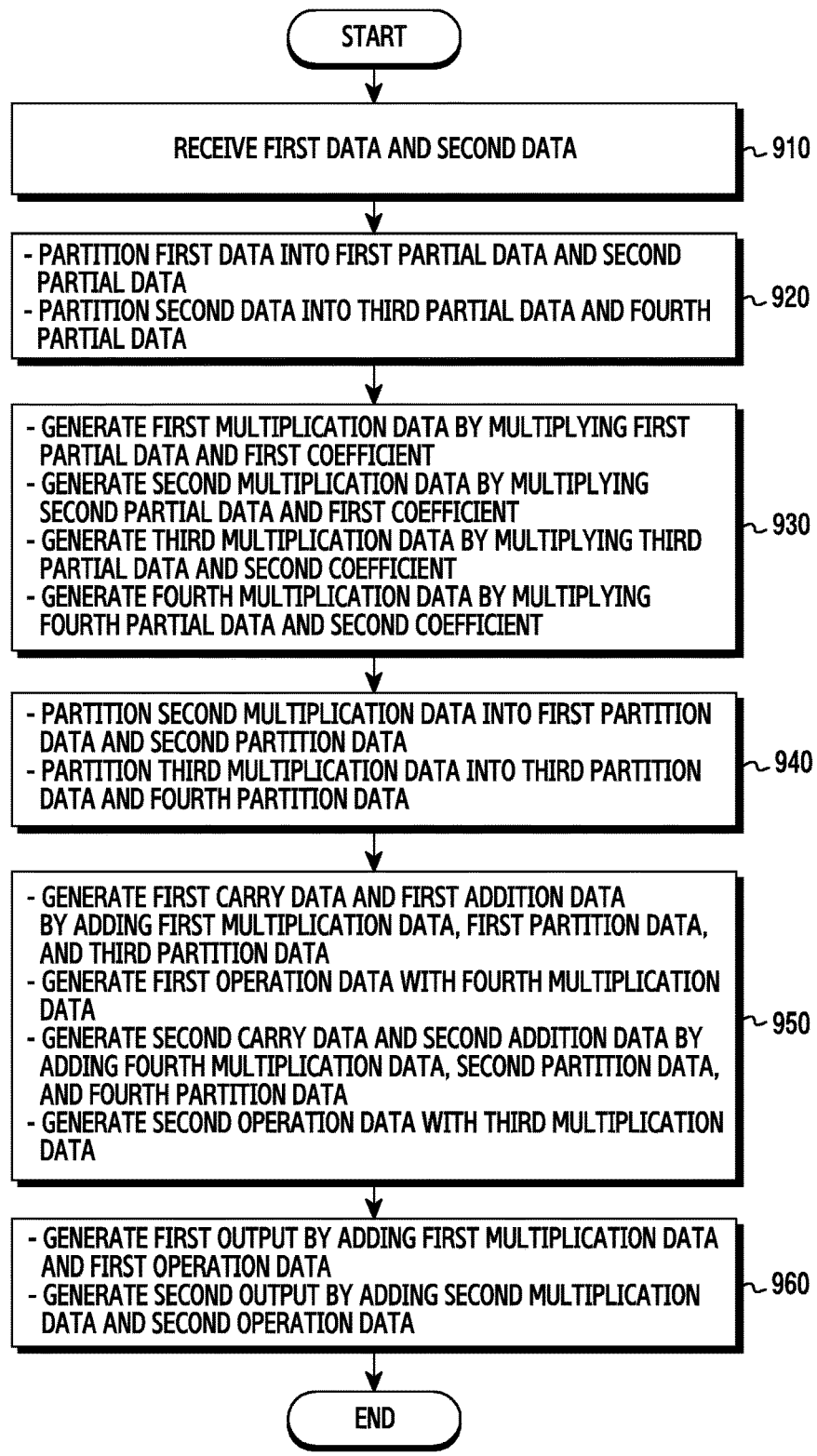
FIG. 9A is a flowchart of an operating method for an arithmetic apparatus according to a fifth embodiment.

FIG. 9A is a flowchart of an operating method for an arithmetic apparatus to multiply a complex number and a coefficient according to a fifth embodiment. Such an operation may be performed by, for example, the arithmetic apparatus 200 shown in FIG. 2.

The steps in the flowchart of FIG. 9A perform the arithmetic operations as shown in Equation (6) below:

$$A = A_i + jA_q$$

$$B = B_i + jB_q$$

$$CA_x DB = C_x(A_i + jA_q) + D_x(B_i + jB_q) = CA_i + DB_i + j(CA_q + DB_q) \quad (6)$$

A is first data having a 2N-bit size, and B is second data having a 2N-bit size. C is a first coefficient having an N-bit size and D is a second coefficient having an N-bit size. C and D may be input as one 2N-bit data like A and B. $A_i$ (first partial data), $A_q$ (second partial data), $B_i$ (third partial data), and $B_q$ (fourth partial data) are the same variables as before. However, first multiplication data through fourth multiplication data have different variables than before, as described below.

In step 910, the arithmetic apparatus receives the first data A and the second data B, comprising two 2N-bit complex numbers.

In step 920, as above, the arithmetic apparatus (a) partitions the first data into the first partial data $A_i$ and the second partial data $A_q$, and (b) partitions the second data into the third partial data $B_i$ and the fourth partial data $B_j$. The first partial data through fourth partial data have an N-bit size.

In step 930, the arithmetic apparatus (a) generates the first multiplication data M1 by multiplying the first partial data $A_i$ and the first coefficient C, (b) generates the second multiplication data M2 by multiplying the second partial data $A_q$ and the first coefficient C, (c) generates the third multiplication data M3 by multiplying the third partial data and the second coefficient D, and (d) generates the fourth multiplication data M4 by multiplying the fourth partial data and the second coefficient D. Accordingly, M1=$CA_i$; M2=$CA_q$; M3=$DB_i$; and M4=$DB_q$.

In step 940, the arithmetic apparatus (a) partitions the second multiplication data M2 into first partition data and second partition data, and (b) partitions the third multiplication data M3 into third partition data and fourth partition data.

In step 950, the arithmetic apparatus (a) generates first carry data and first addition data by adding the first multiplication data M1, the first partition data, and the third partition data, (b) generates first operation data $O_1$ with the fourth multiplication data, (c) generates second carry data and second addition data by adding the fourth multiplication data M4, the second partition data, and the fourth partition data, and (d) generates second operation data $O_2$ with the third multiplication data M3.

In step 960, the arithmetic apparatus (a) generates a first output by adding the first multiplication data M1 and the first operation data $O_1$, and (b) generates a second output by adding the second multiplication data M2 and the second operation data $O_2$. The first output is the real part of the resulting value from multiplying the complex numbers and the coefficients, and the second output is the imaginary part of the resulting value from multiplying the complex numbers and the coefficients.

Figure 9B:
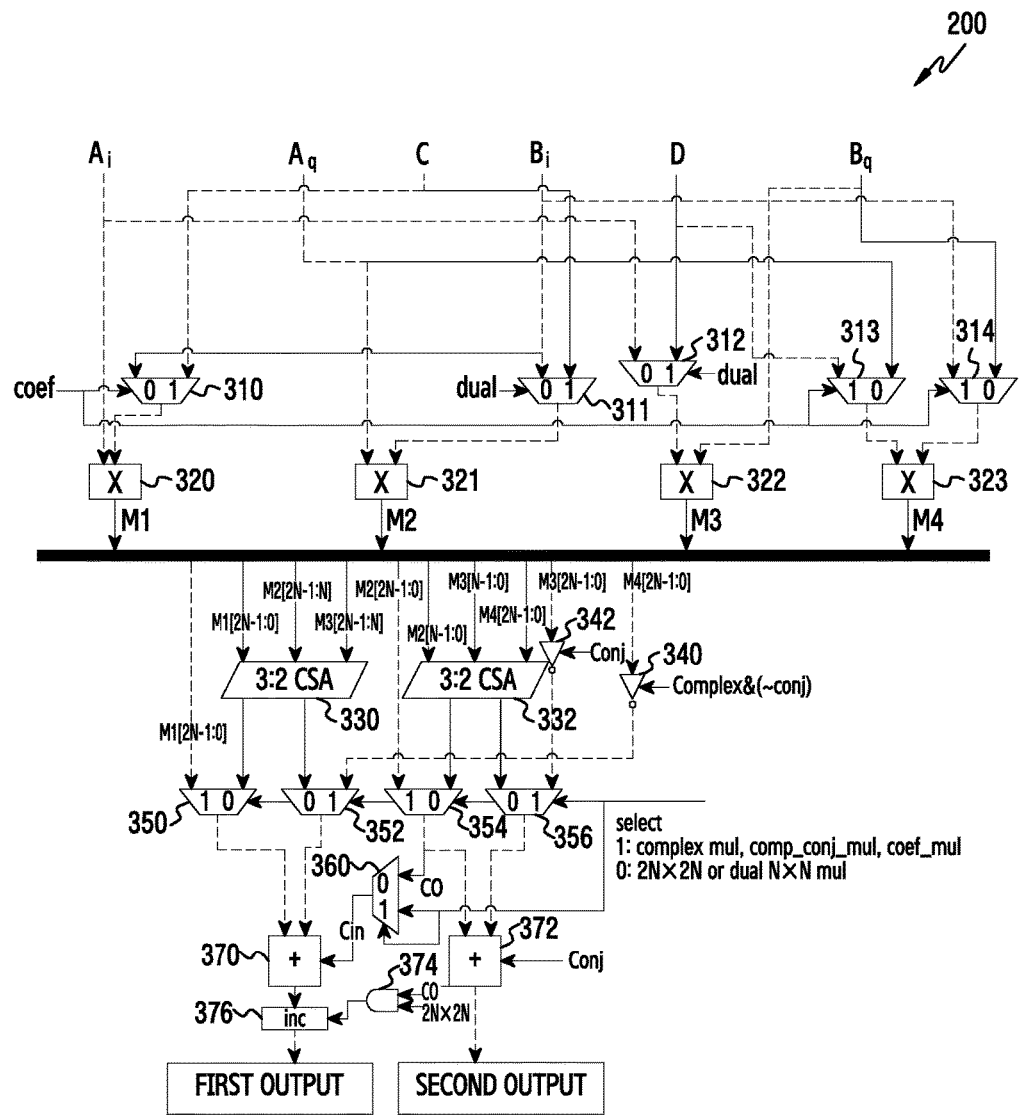
FIG. 9B illustrates a circuit configuration of the arithmetic apparatus according to the fifth embodiment.

FIG. 9B illustrates a circuit configuration of the arithmetic apparatus according to the fifth embodiment. In FIG. 9B, the components and connections are the same as FIGS. 3, 5B, 6B, 7B, and 8B, but the control inputs are changed in order to perform multiplication between a complex number and a coefficient.

When performing multiplication of a complex number and a coefficient, the following settings should be used: the coef value is 1, the dual value is 1, the conj value is 0, the complex value is 0, and the select value is 1.

The multipliers 320-323 generate first multiplication data M1 by multiplying the first partial data $A_i$ and the first coefficient C (M1=$CA_i$), generate second multiplication data M2 by multiplying the second partial data $A_q$ and the first coefficient C (M2=$CA_q$), generate third multiplication data M3 by multiplying the third partial data $B_i$ and the second coefficient D (M3=$DB_i$), and generate fourth multiplication data M4 by multiplying the fourth partial data $B_q$ and the second coefficient D (M4=$DB_q$).

Because select=1, the outputs of CSA 330 and CSA 332 are not used by MUXs 350 through 356 and can be ignored.

Because complex=0, the NOT gate 340 generates first operation data $O_1$ with the fourth multiplication data M4. This is because the real part of the multiplication of the complex number and the coefficient does not have a negative value.

Because conj=1, the NOT gate 342 generate second operation data $O_2$ with the third multiplication data M3. This is because the imaginary part of the multiplication of the complex number and the coefficient does not have a negative value.

The adder 370 generates the first output by adding the first multiplication data M1 and the first operation data $O_1$ (=+M4). Accordingly, the first output is M1+M4, or, equivalently, $CA_i+DB_q$, the real part of the result of multiplying complex numbers by coefficients.

The adder 372 generates the second output by adding the second multiplication data M2 and the second operation data $O_2$ (=+M3). Accordingly, the first output is M2+M3, or, equivalently, $CA_q+DB_i$, the imaginary part of the result of multiplying complex numbers by coefficients.

Methods based on the embodiments disclosed in the claims and/or specification of the present disclosure can be implemented in hardware, software, or a combination of both.

When implemented in software, a non-transitory computer readable recording medium for storing one or more programs (software modules) can be provided. The one or more programs stored in the computer readable recording medium are configured for execution performed by one or more processors in an electronic device. The one or more programs include instructions for allowing the electronic device to execute the methods based on the embodiments disclosed in the claims and/or specification of the present disclosure.

The program (the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory may be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can access via an external port to the apparatus performing the embodiments of the present disclosure. In addition, a separate storage device on the communication network can access the apparatus performing the embodiments of the present disclosure.

While the invention has been shown and described with reference to certain embodiments thereof, it will be understood by those skilled in the art that various changes in form and details may be made therein without departing from the spirit and scope of the invention as defined by the appended claims. Therefore, the scope of the disclosure is defined not by the detailed description but by the appended claims, and all differences within the scope will be construed as being included in the present disclosure.

What is claimed is:

1. A method for operating an arithmetic apparatus, the method comprising:

receiving, using an input unit of the arithmetic apparatus, first multiplication data, second multiplication data, third multiplication data, and fourth multiplication data, each comprising 2N bits;

dividing, using a partition unit, the second multiplication data into first partition data and second partition data, each comprising N bits;

dividing, using the partition unit, the third multiplication data into third partition data and fourth partition data, each comprising N bits;

generating, using a first carry save adder, first carry data and first addition data by performing an arithmetic operation with respect to the first multiplication data, the first partition data, and the third partition data;

generating, using an arithmetic operation controller, first operation data based on the fourth multiplication data according to the arithmetic operation command;

generating, using a second carry save adder, second carry data and second addition data by performing the arithmetic operation with respect to the fourth multiplication data, the second partition data, and the fourth partition data;

generating, using the arithmetic operation controller, second operation data based on the third multiplication data according to the arithmetic operation command;

generating, using the arithmetic operation controller, a first output based on at least one input of the first multiplication data, the first carry data, the first addition data, and the first operation data according to the arithmetic operation command; and generating, using the arithmetic operation controller, a second output based on at least one input of the second multiplication data, the second carry data, the second addition data, and the second operation data according to the arithmetic operation command, herein dividing the second multiplication data into the first partition data and the second partition data and dividing the third multiplication data into the third partition data and the fourth partition data are performed simultaneously, herein generating the first carry data and the first addition data, generating the first operation data, generating the second carry data and the second addition data, and generating the second operation data are performed simultaneously, and wherein generating the first output and generating the second output are performed simultaneously.

2. The method of claim 1, wherein generating the first carry data and the first addition data comprises:

adding the first multiplication data, the first partition data, and the third partition data using the first carry save adder, and wherein generating the second carry data and the second addition data comprises:

adding the fourth multiplication data, the second partition data, and the fourth partition data using the second carry save adder.

3. The method of claim 2, further comprising:

receiving first partial data, second partial data, third partial data, and fourth partial data, each comprising N bits;

generating the first multiplication data by multiplying the first partial data and the third partial data;

generating the second multiplication data by multiplying the second partial data and the third partial data;
generating the third multiplication data by multiplying the first partial data and the fourth partial data; and
generating the fourth multiplication data by multiplying the second partial data and the fourth partial data,
wherein generating the first multiplication data, generating the second multiplication data, generating the third multiplication data, and generating the fourth multiplication data are performed simultaneously.

4. The method of claim 3, further comprising:
receiving first data and second data, each comprising 2N bits;
dividing the first data into the first partial data and the second partial data; and
dividing the second data into the third partial data and the fourth partial data,
wherein dividing the first data and dividing the second data are performed simultaneously.

5. The method of claim 4, wherein each of the first data and the second data is a 2N-bit integer,
wherein the arithmetic operation command comprises a command to multiply the first data and the second data,
wherein generating the first output comprises:
adding the first carry data and the first addition data according to the arithmetic operation command, and
wherein generating the second output comprises:
adding the second carry data and the second addition data according to the arithmetic operation command.

6. The method of claim 4, wherein each of the first partial data through fourth partial data is a N-bit integer,
wherein the arithmetic operation command comprises a command to multiply the first partial data and the third partial data, and a command to multiply the second partial data and the fourth partial data,
wherein the method further comprises:
setting the second multiplication data and the third multiplication data to 0,
wherein generating the first output comprises:
adding the first carry data and the first addition data according to the arithmetic operation command, and
wherein generating the second output comprises:
adding the second carry data and the second addition data according to the arithmetic operation command.

7. The method of claim 4, wherein the first data is a complex number which comprises the first partial data as a real part and the second partial data as an imaginary part,
wherein the second data is a complex number which comprises the third partial data as a real part and the fourth partial data as an imaginary part,
wherein the arithmetic operation command comprises a command to multiply the first data and the second data,
wherein generating the first operation data comprises:
performing a NOT operation with respect to the fourth multiplication data according to the arithmetic operation command,
wherein the second operation data is generated with the third multiplication data according to the arithmetic operation command,
wherein generating the first output comprises:
adding the first multiplication data and the first operation data according to the arithmetic operation command, and
wherein generating the second output comprises:
adding the second multiplication data and the second operation data according to the arithmetic operation command.

8. The method of claim 4, wherein the first data is a complex number which comprises the first partial data as a real part and the second partial data as an imaginary part,
wherein the second data is a complex number which comprises the third partial data as a real part and the fourth partial data as an imaginary part,
wherein the arithmetic operation command comprises a command to multiply the first data and a conjugate complex number of the second data,
wherein the first operation data is generated with the fourth multiplication data according to the arithmetic operation command,
wherein generating the second operation data comprises:
performing a NOT operation with respect to the third multiplication data according to the arithmetic operation command,
wherein generating the first output comprises:
adding the first multiplication data and the first operation data according to the arithmetic operation command, and
wherein generating the second output comprises:
adding the second multiplication data and the second operation data according to the arithmetic operation command.

9. The method of claim 4, wherein the first data is a complex number which comprises the first partial data as a real part and the second partial data as an imaginary part,
wherein the second data is a complex number which comprises the third partial data as a real part and the fourth partial data as an imaginary part,
wherein the method further comprises:
receiving a first coefficient and a second coefficient, and
wherein the arithmetic operation command comprises a command to add a complex number which is the first data multiplied by the first coefficient, and a complex number which is the second data multiplied by the second coefficient.

10. The method of claim 1, wherein the arithmetic operation command comprises one or more of a command to multiply 2N bit integers, a command to multiply N bit integers, a command to multiply 2N bit complex numbers, a command to multiply a 2N complex number and a conjugate complex number of a 2N bit complex number, or a command to add a 2N bit complex number multiplied by a first coefficient and a 2N bit complex number multiplied by a second coefficient.

11. An arithmetic apparatus comprising:
an arithmetic operation controller;
an input unit configured to receive first multiplication data, second multiplication data, third multiplication data, and fourth multiplication data, each comprising 2N bits;
a partition unit configured to divide the second multiplication data into first partition data and second partition data, each comprising N bits, and divide the third multiplication data into third partition data and fourth partition data, each comprising N bits; and
a first carry save adder and a second carry save adder operatively coupled with the arithmetic operation controller, the first carry adder configured to generate first carry data and first addition data by performing an arithmetic operation with respect to the first multiplication data, the first partition data, and the third partition data, and the second carry adder configured to generate second carry data and second addition data by performing the arithmetic operation with respect to the fourth multiplication data, the second partition data, and the fourth partition data, wherein the arithmetic operation controller is configured to generate first operation data based on the fourth multiplication data according to an arithmetic operation command, and generate second operation data based on the third multiplication data according to the arithmetic operation command, wherein the arithmetic operation controller is further configured to generate a first output based on at least one input of the first multiplication data, the first carry data, the first addition data, and the first operation data according to the arithmetic operation command, and generate a second output based on at least one input of the second multiplication data, the second carry data, the second addition data, and the second operation data according to the arithmetic operation command, wherein the partition unit is further configured to divide the second multiplication data into the first partition data and the second partition data and divide the third multiplication data into the third partition data and the fourth partition data simultaneously, wherein the first carry save adder is configured to generate the first carry data and the first addition data, and generate the first operation data, simultaneously with the second carry save adder configured to generate the second carry data and the second addition data, and generate the second operation data, and wherein the arithmetic operation controller is further configured to generate the first output and to generate the second output simultaneously.

12. The apparatus of claim 11, wherein the first carry data and the first addition data are generated by adding the first multiplication data, the first partition data, and the third partition data, and the second carry data and the second addition data are generated by adding the fourth multiplication data, the second partition data, and the fourth partition data.

13. The apparatus of claim 12, further comprising:
a multiplication unit operatively coupled with the arithmetic operation controller,
wherein the input unit is further configured to receive first partial data, second partial data, third partial data, and fourth partial data, each comprising N bits,
wherein the arithmetic operation controller is further configured to generate the first multiplication data by multiplying the first partial data and the third partial data, generate the second multiplication data by multiplying the second partial data and the third partial data, generate the third multiplication data by multiplying the first partial data and the fourth partial data, and generate the fourth multiplication data by multiplying the second partial data and the fourth partial data, and
wherein generating the first multiplication data, generating the second multiplication data, generating the third multiplication data, and generating the fourth multiplication data are performed simultaneously.

14. The apparatus of claim 13, wherein the input unit is further configured to receive first data and second data, each comprising 2N bits,
wherein the partition unit is further configured to divide the first data into the first partial data and the second partial data, and divide the second data into the third partial data and the fourth partial data, and
wherein dividing the first data and dividing the second data are performed simultaneously.

15. The apparatus of claim 14, wherein each of the first data and the second data is a 2N-bit integer,
wherein the arithmetic operation command comprises a command to multiply the first data and the second data,
wherein the arithmetic operation controller is configured to generate the first output by adding the first carry data and the first addition data according to the arithmetic operation command, and generate the second output by adding the second carry data and the second addition data according to the arithmetic operation command.

16. The apparatus of claim 14, wherein each of the first partial data through fourth partial data is a N-bit integer,
wherein the arithmetic operation command comprises a command to multiply the first partial data and the third partial data, and a command to multiply the second partial data and the fourth partial data,
wherein the arithmetic operation controller is further configured to set the second multiplication data and the third multiplication data to 0,
wherein the arithmetic operation controller is configured to generate the first output by adding the first carry data and the first addition data according to the arithmetic operation command, and
wherein the arithmetic operation controller is configured to generate the second output by adding the second carry data and the second addition data according to the arithmetic operation command.

17. The apparatus of claim 14, wherein the first data is a complex number which comprises the first partial data as a real part and the second partial data as an imaginary part,
wherein the second data is a complex number which comprises the third partial data as a real part and the fourth partial data as an imaginary part,
wherein the arithmetic operation command comprises a command to multiply the first data and the second data,
wherein the arithmetic operation controller is configured to generate the first operation data by performing a NOT operation with respect to the fourth multiplication data according to the arithmetic operation command,
wherein the arithmetic operation controller is configured to generate the second operation data with the third multiplication data according to the arithmetic operation command,
wherein the arithmetic operation controller is configured to generate the first output by adding the first multiplication data and the first operation data according to the arithmetic operation command, and
wherein the arithmetic operation controller is configured to generate the second output by adding the second multiplication data and the second operation data according to the arithmetic operation command.

18. The apparatus of claim 14, wherein the first data is a complex number which comprises the first partial data as a real part and the second partial data as an imaginary part,
wherein the second data is a complex number which comprises the third partial data as a real part and the fourth partial data as an imaginary part,
wherein the arithmetic operation command comprises a command to multiply the first data and a conjugate complex number of the second data,
wherein the arithmetic operation controller is configured to generate the first operation data with the fourth multiplication data according to the arithmetic operation command,
wherein the arithmetic operation controller is configured to generate the second operation data by performing a NOT operation with respect to the third multiplication data according to the arithmetic operation command, wherein the arithmetic operation controller is configured to generate the first output by adding the first multiplication data and the first operation data according to the arithmetic operation command, and wherein the arithmetic operation controller is configured to generate the second output by adding the second multiplication data and the second operation data according to the arithmetic operation command.

19. The apparatus of claim 14, wherein the first data is a complex number which comprises the first partial data as a real part and the second partial data as an imaginary part, wherein the second data is a complex number which comprises the third partial data as a real part and the fourth partial data as an imaginary part, wherein the input unit is further configured to receive a first coefficient and a second coefficient, and wherein the arithmetic operation command comprises a command to add a complex number which is the first data multiplied by the first coefficient, and a complex number which is the second data multiplied by the second coefficient.

20. A method for arithmetic operations performed by an arithmetic apparatus, the method comprising:

receiving, using an input unit of the arithmetic apparatus, first data A and second data B, each comprising 2N bits, wherein A comprises N bit $A_i$ and N bit $A_q$ and B comprises N bit $B_i$ and N bit $B_q$;

generating, using a multiplication unit, first multiplication data M1 comprising $A_iB_i$;

generating, using the multiplication unit, second multiplication data M2 comprising $A_qA_i$;

generating, using the multiplication unit, third multiplication data M3 comprising $A_iB_q$;

generating, using the multiplication unit, fourth multiplication data M4 comprising $A_qB_q$; and when multiplying A and B as integers:

dividing, using a partition unit, M2 into M2[2N−1:N] and M2[N−1:0];

dividing, using the partition unit, M3 into M3[2N−1:N] and M3[N−1:0];

generating, using a first carry save adder, first carry data and first addition data by adding M1, M2[2N−1:N], and M3[2N−1:N];

generating, using a second carry save adder, second carry data and second addition data by adding M4, M2[N−1:0], and M3[N−1:0];

generating, using an arithmetic operation controller, first output by adding the first carry and addition data, wherein the first output comprises the upper bits [2N−1:N] of the multiplication result;

generating, using the arithmetic operation controller, second output by adding the second carry and addition data, wherein the second output comprises the lower bits [N−1:0] of the multiplication result; and combining, using the arithmetic operation controller, the first and second output to generate the multiplication result.

* * * * *